US012439197B2

(12) United States Patent
Wang et al.

(10) Patent No.: US 12,439,197 B2
(45) Date of Patent: Oct. 7, 2025

(54) EARPHONE

(71) Applicant: Honor Device Co., Ltd., Shenzhen (CN)

(72) Inventors: Chuanguo Wang, Shenzhen (CN); Chienfeng Yeh, Shenzhen (CN); Yunhai Li, Shenzhen (CN); Haihong Zhang, Shenzhen (CN); Yonghua Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/037,122

(22) PCT Filed: Dec. 8, 2022

(86) PCT No.: PCT/CN2022/137672

§ 371 (c)(1),
(2) Date: May 16, 2023

(87) PCT Pub. No.: WO2023/160114

PCT Pub. Date: Aug. 31, 2023

(65) Prior Publication Data

US 2024/0348967 A1 Oct. 17, 2024

(30) Foreign Application Priority Data

Feb. 28, 2022 (CN) ......................... 202210191140.6

(51) Int. Cl.
*H04R 1/10* (2006.01)
*H04R 1/24* (2006.01)
(Continued)

(52) U.S. Cl.
CPC ......... *H04R 1/1075* (2013.01); *H04R 1/1016* (2013.01); *H04R 1/1083* (2013.01);
(Continued)

(58) Field of Classification Search
None
See application file for complete search history.

(56) References Cited

U.S. PATENT DOCUMENTS 9,756,427 B2 9/2017 Doshida et al.
9,860,647 B2 1/2018 Wen et al.
(Continued)

FOREIGN PATENT DOCUMENTS

CN 104967958 A 10/2015
CN 105263077 A 1/2016
(Continued)

*Primary Examiner* — Kenny H Truong
(74) *Attorney, Agent, or Firm* — Slater Matsil, LLP

(57) ABSTRACT

An earphone, including: a housing, a first speaker unit, a second speaker unit. The housing has a sound output hole. The first speaker unit and the second speaker unit are separately independently fastened in the housing. The first speaker unit produces a sound toward the sound output hole. The second speaker unit is located on a side that is of the first speaker unit and that is away from the sound output hole and is spaced apart from the first speaker unit. A sound production frequency of the second speaker unit is smaller than a sound production frequency of the first speaker unit. A cavity is enclosed by the first speaker unit, the second speaker unit, and an inner wall of the housing, the cavity serves as a front cavity of the second speaker unit, and the front cavity communicates with the sound output hole through a sound output channel.

20 Claims, 14 Drawing Sheets

(51) Int. Cl.
*H04R 9/02* (2006.01)
*H04R 9/06* (2006.01)
*H04R 17/00* (2006.01)

(52) U.S. Cl.
CPC ............... *H04R 1/24* (2013.01); *H04R 9/025* (2013.01); *H04R 9/06* (2013.01); *H04R 17/00* (2013.01); *H04R 2460/01* (2013.01)

(56) References Cited

U.S. PATENT DOCUMENTS

| | | | |
|---|---|---|---|
| 2017/0325014 A1 | 11/2017 | Wen et al. | |
| 2018/0324519 A1 | 11/2018 | Park et al. | |
| 2021/0021920 A1* | 1/2021 | Choi .................... | H04R 1/1016 |

FOREIGN PATENT DOCUMENTS

| | | | |
|---|---|---|---|
| CN | 107371077 | A | 11/2017 |
| CN | 208112885 | U | 11/2018 |
| CN | 209710289 | U | 11/2019 |
| CN | 212086420 | U | 12/2020 |
| CN | 110099323 | B | 4/2021 |
| CN | 213342622 | U | 6/2021 |
| CN | 214544741 | U | 10/2021 |
| JP | 2016042685 | A | 3/2016 |
| JP | 2019501605 | A | 1/2019 |

* cited by examiner

EARPHONE

CROSS-REFERENCE TO RELATED APPLICATIONS

This application is a national stage of International Application No. PCT/CN2022/137672, filed on Dec. 8, 2022, which claims priority to Chinese Patent Application No. 202210191140.6, filed on Feb. 28, 2022. The disclosures of both of the aforementioned applications are hereby incorporated by reference in their entireties.

TECHNICAL FIELD

This application relates to the field of electronic product technologies, and in particular, to an earphone.

BACKGROUND

During use of an electronic product, to enable a user to listen to sound information provided by the electronic product without disturbing others, an earphone has become an essential accessory for the electronic product.

In the related technology, a sound output effect of the earphone is poor and needs to be further improved.

SUMMARY

Embodiments of this application provide an earphone, to help improve a sound output effect of the earphone.

To achieve the foregoing objective, the following technical solutions are used in the embodiments of this application.

An earphone according to the embodiments of this application may include a housing, a first speaker unit, and a second speaker unit. The housing has a sound output hole. The first speaker unit and the second speaker unit are separately independently fastened in the housing. The first speaker unit produces a sound toward the sound output hole. The second speaker unit is located on a side that is of the first speaker unit and that is away from the sound output hole and is spaced apart from the first speaker unit. A sound production frequency of the second speaker unit is smaller than a sound production frequency of the first speaker unit. A cavity is enclosed by the first speaker unit, the second speaker unit, and an inner wall of the housing, the cavity serves as a front cavity of the second speaker unit, and the front cavity communicates with the sound output hole through a sound output channel. The sound output channel is formed in the first speaker unit. Specifically, the first speaker unit is annular to define the sound output channel.

According to the earphone provided in the embodiments of this application, the first speaker unit and the second speaker unit are separately independently fastened in the housing. Therefore, when one of the first speaker unit and the second speaker unit is damaged due to a fault, only the damaged one needs to be detached for replacement or maintenance, to avoid that the first speaker unit and the second speaker unit need to be integrally detached for replacement due to modularization of the first speaker unit and the second speaker unit, thereby helping reduce maintenance costs, and further avoiding damage caused to the speaker unit that does not need to be replaced during detachment. In addition, compared with the design in which the first speaker unit and the second speaker unit are modularized, when the first speaker unit and the second speaker unit are independently fastened in the housing, a connecting piece between the first speaker unit and the second speaker unit is omitted, and only a physical connection needs to be implemented by using the housing as the connecting piece between the first speaker unit and the second speaker unit. This helps save space in the housing, thereby facilitating integration of more functional components in the earphone, and further facilitating proper optimization of a structural layout in the earphone. Moreover, the feature that the sound production frequency of the first speaker unit is higher than the sound production frequency of the second speaker unit may be used to further improve a high frequency loss of the earphone, so that the earphone has a relatively good sound expression in sound ranges of different frequencies, thereby improving a sound output effect of the earphone.

In some embodiments provided in this application, the housing includes a front housing and a rear housing. The front housing is detachably connected to the rear housing. The sound output hole is formed in the front housing, and the first speaker unit and the second speaker unit are located in the front housing. This can facilitate separate processing of the front housing and the rear housing, which helps simplify mold structures of the front housing and the rear housing, thereby reducing difficulty of molding the front housing and the rear housing, and further reducing difficulty of processing and manufacturing the housing. In addition, this also helps detach the front housing from the rear housing to facilitate maintenance of the earphone.

In some examples, a material of the front housing and/or a material of the rear housing are/is hard plastic, which helps achieve a lightweight of the earphone.

Specifically, the front housing includes a main portion and a sound outlet. A first accommodating cavity may be formed inside the main portion, and a side that is of the first accommodating cavity and that is adjacent to the rear housing is open. The sound outlet is located on a side that is of the main portion and that is away from the rear housing and extends toward a direction away from the rear housing. The sound outlet communicates with the first accommodating cavity, and the sound output hole is formed at an end that is of the sound outlet and that is away from the main portion. The sound outlet is disposed and the sound output hole is disposed on the sound outlet, so that the sound outlet can extend into an ear canal of a human ear to shorten a distance between the sound output hole of the earphone and an eardrum of the human ear. Therefore, a sound produced by the earphone is well received by a user, thereby improving use experience.

In some embodiments provided in this application, a support step is formed on an inner peripheral surface of the housing, and the second speaker unit is supported and fastened on the support step. This disposing facilitates positioning and mounting of the second speaker unit.

In some embodiments provided in this application, the second speaker unit is a moving coil speaker unit.

In some embodiments provided in this application, the second speaker unit includes a diaphragm assembly, a voice coil, a magnetic circuit system, and a basin frame, and a side that is of the basin frame and that faces the sound output hole is open, and the diaphragm assembly is fastened at an open end of the basin frame. The voice coil and magnetic circuit system are located in the basin frame. The voice coil is connected to the diaphragm assembly. The magnetic circuit system has a magnetic gap, and an end that is of the voice coil and that is away from the diaphragm assembly extends into the magnetic gap, so that the magnetic circuit system can cooperate with the voice coil to drive the diaphragm assembly to vibrate synchronously. Therefore, a structure of the second speaker unit is simple.

In some embodiments provided in this application, an inner peripheral surface of the open end of the basin frame is provided with an annular groove that is recessed toward a direction away from a central axis of the basin frame. The annular groove extends in an annular shape along a circumferential direction of the basin frame, and an end surface that is of the annular groove and that extends to the open end of the basin frame is an end surface at an end facing the sound output hole. An outer edge of the diaphragm assembly is accommodated in the annular groove and fastened on a wall surface that is of the annular groove and that directly faces the sound output hole. This helps effectively support the diaphragm assembly by using the annular groove, and can further increase a volume of space in the basin frame, thereby helping set a larger size of the diaphragm assembly, and further helping enlarge an effective vibration area of the diaphragm assembly and improve a low-frequency effect of the second speaker unit.

In some embodiments provided in this application, the diaphragm assembly includes a connecting section, a corrugated rim, and a dome surrounded by the corrugated rim. The connecting section is disposed through laminating on the wall surface that is of the annular groove and that directly faces the sound output hole. The voice coil is connected to the dome. An outer peripheral edge of the corrugated rim is connected to an inner peripheral edge of the connecting section. The corrugated rim protrudes toward a direction of the sound output hole. This helps further decrease a volume of the front cavity to make the structure compact.

In some examples, the diaphragm assembly is an integrally formed member. This disposing helps improve structural strength of the diaphragm assembly, and facilitates processing and manufacturing of the diaphragm assembly.

In some embodiments provided in this application, the magnetic circuit system includes an edge magnetic portion and a first central magnetic portion. The edge magnetic portion is located at an outer circumference of the first central magnetic portion to define the magnetic gap with the first central magnetic portion. A magnetizing direction of the edge magnetic portion is opposite to a magnetizing direction of the first central magnetic portion, so that the edge magnetic portion and the first central magnetic portion can form a magnetic loop for driving the voice coil to move.

In some embodiments provided in this application, the magnetic circuit system includes a second central magnetic portion. The second central magnetic portion blocks an end that is of the edge magnetic portion and that is away from the diaphragm assembly, and the first central magnetic portion and the second central magnetic portion are disposed through laminating. The second central magnetic portion may be a member made of a magnetoconductive material. In this way, leakage of a magnetic line may be restricted by using the second central magnetic portion, to increase magnetic induction strength of the magnetic circuit system.

In some embodiments provided in this application, the magnetic circuit system further includes a magnetically conductive yoke. The magnetically conductive yoke is disposed on a side that is of the first central magnetic portion and that faces the diaphragm assembly, and is configured to restrict leakage of the magnetic line, to improve driving force for the diaphragm assembly.

Specifically, an outer peripheral surface of the magnetically conductive yoke is flush with an outer peripheral surface of the first central magnetic portion in an axial direction of the magnetic circuit system. This helps further improve a restriction effect of the magnetically conductive yoke on the magnetic line, and increase magnetic induction strength of the magnetic circuit system. In addition, the magnetic gap is not affected by the magnetically conductive yoke, which helps improve performance of cooperation between the magnetic circuit system and the voice coil.

In some embodiments provided in this application, the first speaker unit is a piezoelectric ceramic speaker unit. The piezoelectric ceramic speaker unit is small in thickness and small in volume, and has a fairly good high-frequency sound effect.

In some embodiments provided in this application, the first speaker unit includes a vibration plate and a piezoelectric ceramic sheet. The vibration plate and the piezoelectric ceramic sheet each are in a shape of an annular flat plate. The first speaker unit is fastened in the housing by using the vibration plate. The piezoelectric ceramic sheet is disposed through laminating on a surface on a side that is of the vibration plate and that faces the sound output hole. In this way, the front cavity can be defined by using a surface on a side that is of the vibration plate and that faces the second speaker unit, the diaphragm assembly, and an inner wall surface of the housing, to help improve regularity of a shape of the front cavity, thereby further improving a sound production effect of the second speaker unit.

Specifically, the vibration plate includes a bearing portion and a connecting portion. The bearing portion is configured to bear the piezoelectric ceramic sheet and directly faces the piezoelectric ceramic sheet. The connecting portion is disposed around an outer periphery of the bearing portion, to fix the first speaker unit by using the connecting portion. In this way, when the vibration plate is connected to the housing, the piezoelectric ceramic sheet is suspended, and the bearing portion of the vibration plate is also in the suspended state, so that the piezoelectric ceramic sheet can drive vibration of the vibration plate.

For example, a material of the vibration plate includes but is not limited to metal and plastic.

In some embodiments provided in this application, the earphone includes a bracket, and the bracket is located between the first speaker unit and the sound output hole. The first speaker unit is fastened in the housing by using the bracket. Disposing of the bracket can facilitate mounting of the first speaker unit. In addition, the bracket is disposed between the first speaker unit and the sound output hole, which can avoid a problem that a relatively large front cavity needs to be disposed due to disposing of the bracket, and can further help form a regular front cavity to help improve a sound production effect of the second speaker unit.

In some embodiments provided in this application, the bracket includes an annular fixing portion, and an outer peripheral edge of the first speaker unit is fastened on the inner peripheral surface of the housing by using the fixing portion. For example, the connecting portion of the vibration plate is fastened through laminating on the fixing portion, and the fixing portion is fastened on the inner peripheral surface of the housing.

In some embodiments provided in this application, a first step is formed on the inner peripheral surface of the housing, and the fixing portion is supported and fastened on the first step. Disposing of the first step can facilitate overall positioning and mounting of the bracket and the first speaker unit.

In some embodiments provided in this application, the fixing portion includes a fixing plate and an annular flange, the fixing plate is supported and fastened on a step surface that is of the first step and that faces the second speaker unit, the annular flange is disposed around an edge of the fixing plate and protrudes toward a direction of the second speaker unit, and the outer peripheral edge of the first speaker unit is supported and fastened on an end surface on a side that is of the annular flange and that is away from the sound output hole. This helps design a larger size of the first speaker unit, to further improve a sound output effect. In addition, when the annular flange is fastened on a step surface that is of the first step and that faces a central axis of the second speaker unit, it is further helpful to enlarge a connection area between the bracket and the housing, to improve reliability of connection between the bracket and the housing.

In some embodiments provided in this application, a material of the fixing portion is a flexible material. In this way, vibration transferred from the first speaker unit to the housing can be attenuated by using a cushioning effect of the fixing portion, thereby improving the comfort of a user in wearing the earphone and improving a sound production effect of the first speaker unit. In addition, vibration of the housing can be prevented, to a specific extent, from interfering with air vibration in the front cavity, thereby helping improve a sound production effect of the second speaker unit.

For example, the material of the fixing portion is rubber or silica gel.

To simplify processing of the entire bracket and ensure material consistency of the bracket, a material of the entire bracket may be a flexible material.

For example, the material of the bracket is hard plastic.

In some embodiments provided in this application, the annular fixing portion defines a sound transmission channel, and the sound transmission channel communicates the sound output hole and the sound output channel, to facilitate sound production of the second speaker unit.

In some embodiments provided in this application, the sound output channel is disposed coaxially with the sound transmission channel. In this way, the sound output channel and the sound transmission channel may directly face each other, thereby improving a sound transmission effect of the sound transmission channel.

In some embodiments provided in this application, the first speaker unit is a piezoelectric ceramic speaker unit, and the sound transmission channel serves as a front sound cavity of the first speaker unit.

In some embodiments provided in this application, the first speaker unit has an external terminal facing the sound output hole. The external terminal is enabled to face the sound output hole, to help form the front cavity of the second speaker unit, and avoid a problem that the external terminal cannot be connected to a wire because the external terminal is located in the front cavity.

In some embodiments provided in this application, a part of a surface that is of the fixing portion and that faces the first speaker unit is recessed toward the direction of the sound output hole to form an avoidance slot, and the avoidance slot is configured to avoid the external terminal, to prevent interference from being generated between the bracket and the external terminal.

In some embodiments provided in this application, the earphone includes a first signal wire. The avoidance slot extends to an outer peripheral edge of the fixing portion, one end of the first signal wire is fastened and electrically connected to the external terminal, and the first signal wire extends toward the direction of the second speaker unit through the avoidance slot. This helps the first signal wire extend from the sound transmission channel through the avoidance slot.

In some embodiments provided in this application, an outer peripheral surface of the first speaker unit has a first contour surface, the inner peripheral surface of the housing has a first region directly facing the first contour surface, the first contour surface and the first region are spaced apart to form a first avoidance gap, the first avoidance gap communicates with the avoidance slot, and the first avoidance gap is configured to avoid the first signal wire. This helps improve wiring reliability of the first signal wire and avoid interference between the first signal wire and other structures in the housing.

To space apart the first contour surface and the first region, for example, the first contour surface is a planar surface. For another example, the first contour surface is an arc-shaped surface extending along a circumferential direction of the housing, and the first contour surface arches toward a direction of a center of the first speaker unit. For still another example, the first region may be recessed toward a direction away from the first contour surface to form a recessed slot.

In some embodiments provided in this application, the housing has a balancing hole. The balancing hole communicates the front cavity and an outer side of the housing. In this way, air pressure in the front cavity and air pressure on the outer side of the housing can be balanced by using the balancing hole, thereby improving the comfort in using the earphone.

Specifically, an avoidance notch is formed at a location that is of the fixing portion and that corresponds to the balancing hole, and the avoidance notch communicates the balancing hole and the sound transmission channel, to implement communication between the air pressure in the front cavity and the air pressure on the outer side of the housing.

In some embodiments provided in this application, the earphone includes a noise-canceling microphone. The noise-canceling microphone is located between the first speaker unit and the sound output hole, and the noise-canceling microphone is fastened in the housing by using the bracket. In this way, the noise-canceling microphone and the first speaker unit are fastened together by using the bracket, to form a modularized design. Therefore, when the first speaker unit, the bracket, and the noise-canceling microphone are mounted, the first speaker unit, the bracket, and the noise-canceling microphone can be easily mounted in the housing as a whole, so that the first speaker unit and the noise-canceling microphone do not need to be separately mounted, which can simplify mounting steps and improve assembly efficiency. In addition, overall structural compactness of the first speaker unit and the noise-canceling microphone is relatively high. In addition, the noise-canceling microphone is located between the first speaker unit and the sound output hole, which helps dispose the noise-canceling microphone close to the sound output hole, to improve a noise-canceling effect of the earphone.

In some embodiments provided in this application, the housing includes a main portion and a sound outlet. The main portion has a first accommodating cavity, the first speaker unit and the second speaker unit are both fastened in the first accommodating cavity, the sound outlet communicates with the first accommodating cavity, the sound output hole is formed at an end that is of the sound outlet and that is away from the main portion, and at least a part of the noise-canceling microphone is located in the sound outlet. This disposing helps the noise-canceling microphone to be closer to the sound output hole, to improve a sound pickup effect of the microphone, thereby further improving a noise-canceling effect of the earphone.

In some embodiments provided in this application, the bracket includes a support plate and the annular fixing portion. The outer peripheral edge of the first speaker unit is fastened on the inner peripheral surface of the housing by using the fixing portion, the support plate is fastened on the fixing portion and extends toward the direction of the sound output hole, and the noise-canceling microphone is fastened on the support plate. Therefore, it is helpful to mount the noise-canceling microphone close to the sound output hole, thereby improving a sound pickup effect of the noise-canceling microphone, to improve a noise-canceling effect of the earphone.

In some embodiments provided in this application, the support plate is located at an inner periphery of the fixing portion and is connected to an inner peripheral wall of the fixing portion. Therefore, interference can be prevented from being generated between the support plate and the inner wall of the housing, thereby avoiding a problem that mounting space of the noise-canceling microphone is insufficient due to interference generated between the noise-canceling microphone and the inner wall of the housing, and helping ensure reliable mounting of the noise-canceling microphone.

In some embodiments provided in this application, the annular fixing portion defines the sound transmission channel, the sound transmission channel communicates the sound output hole and the sound output channel, and orthographic projections of the support plate and the noise-canceling microphone on the first speaker unit are at an outer circumference of the sound output channel. Therefore, the support plate and the noise-canceling microphone can be prevented from shielding sound output of the second speaker unit, thereby ensuring a sound output effect of the second speaker unit.

In some embodiments provided in this application, the orthographic projection of the support plate on the first speaker unit is located between the orthographic projection of the noise-canceling microphone on the first speaker unit and the sound output channel. This disposing helps further prevent interference from being generated between the support plate and the housing.

In some embodiments provided in this application, the earphone includes a main board and a second signal wire, and the noise-canceling microphone is adapted to be electrically connected to the main board through the second signal wire.

In some embodiments provided in this application, the main board is located on a side that is of the second speaker unit and that is away from the sound output hole, giving-way space is formed between the fixing portion and an inner wall surface of the housing, and the second signal wire extends toward a direction of the main board through the giving-way space. This helps avoid the second signal wire, to facilitate connection between the second signal wire and the main board.

In some embodiments provided in this application, the outer peripheral surface of the first speaker unit has a second contour surface, the inner peripheral surface of the housing has a second region directly facing the second contour surface, the second contour surface and the second region are spaced apart to form a second avoidance gap, and the second avoidance gap is configured to avoid the second signal wire. This helps improve wiring reliability of the second signal wire and avoid interference between the second signal wire and other structures in the housing.

To space apart the second contour surface and the second region, for example, the second contour surface is a planar surface. For another example, the second contour surface is an arc-shaped surface extending along the circumferential direction of the housing, and the second contour surface arches toward the direction of the center of the first speaker unit. For still another example, the second region may be recessed toward a direction away from the second contour surface to form a recessed slot.

In some embodiments provided in this application, a part that is of the inner peripheral surface of the housing and that is located between the main board and the fixing portion has a wiring groove, and a part of the second signal wire is fastened in the wiring groove. This helps improve wiring reliability of the second signal wire and avoid interference between the second signal wire and other structures in the housing.

In some embodiments provided in this application, a first positioning portion is formed on an outer peripheral wall of the fixing portion, a second positioning portion is formed on the inner peripheral surface of the housing, and the first positioning portion cooperates with the second positioning portion. This facilitates overall mounting and positioning of the bracket and the first speaker unit, to prevent inverse placement or misplacement.

In some embodiments provided in this application, a third positioning portion is formed on the outer peripheral edge of the first speaker unit, the second positioning portion is formed on the inner wall surface of the housing, and the third positioning portion cooperates with the second positioning portion. This facilitates mounting and positioning of the first speaker unit, to prevent inverse placement or misplacement.

In some embodiments provided in this application, the first speaker unit has the external terminal, the second speaker unit has a wiring terminal, and the external terminal and the wiring terminal are electrically connected through the first signal wire. In this way, an electrical connection relationship between the main board and each of the first speaker unit and the second speaker unit can be simplified.

In some embodiments provided in this application, a part that is of the inner peripheral surface of the housing and that is located between the second speaker unit and the first speaker unit has a wiring slot, and the wiring slot is configured to avoid the first signal wire. This helps improve reliability of the first signal wire and avoid interference between the first signal wire and other structures in the housing.

In some embodiments provided in this application, the first speaker unit is disposed coaxially with the second speaker unit. This helps improve a sound output effect of the sound output channel.

REFERENCE NUMERALS

Figure 1:
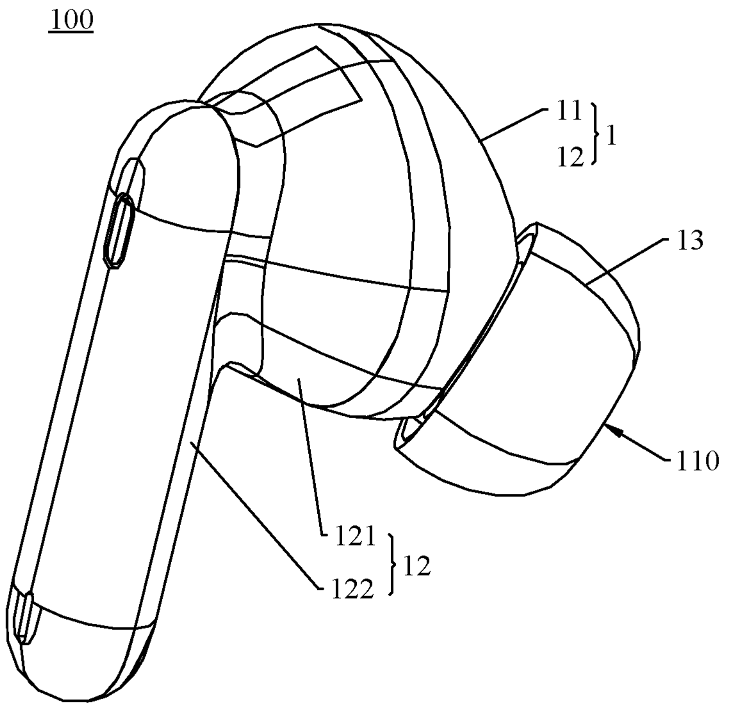
FIG. 1 is a schematic diagram of a structure of an earphone according to some embodiments of this application.

100. earphone;

1. housing; 10. accommodating space; 101. first accommodating cavity; 1011. support step; 11. front housing; 110. sound output hole; 111. main portion; 1111. first region; 1112. second region; 1113. wiring groove; 1114. wiring slot; 1115. second positioning portion; 1116. balancing hole; 112. sound outlet; 1121. limiting convex rib; 113. first step; 12. rear housing; 102. second accommodating cavity; 103. third accommodating cavity; 121. cover body; 122. rod body; 1221. front rod body; 1222. rear rod body; 123. charging contact; 13. contact sleeve;

2. main board;

3. battery;

4. moving coil speaker unit; K1. front cavity; K2. rear cavity;

4*a*. second speaker unit; 4*a*1. diaphragm assembly; 4*a*11. connecting section; 4*a*12. corrugated rim; 4*a*13. dome; 4*a*2. voice coil; 4*a*3. magnetic circuit system; 4*a*3*a*. magnetic gap; 4*a*31. edge magnetic portion; 4*a*32. first central magnetic portion; 4*a*33. second central magnetic portion; 4*a*34. magnetically conductive yoke; 4*a*4. basin frame; 4*a*43. annular groove; 4*a*5. wiring terminal; 4*a*51. negative wiring terminal; 4*a*52. positive wiring terminal; 4*a*6. conductive wire;

4*b*. first speaker unit; 4*b*1. vibration plate; 4*b*11. bearing portion; 4*b*12. connecting portion; 4*b*13. first contour surface; 4*b*13*a*. first avoidance gap; 4*b*14. second contour surface; 4*b*14*a*. second avoidance gap; 4*b*15. third positioning portion; 4*b*2. piezoelectric ceramic sheet; 4*b*21. first electrode layer; 4*b*22. second electrode layer; 4*b*23. piezoelectric body; 4*b*3. external terminal; 4*b*31. positive external terminal; 4*b*32. negative external terminal; 4*bb*. sound output channel;

5. first signal wire;

6. second signal wire;

7. bracket; 71. support plate; 72. fixing portion; 721. annular flange; 722. fixing plate; 723. sound transmission channel; 724. giving-way slot; 724*a*. giving-way space; 725. avoidance slot; 726. first positioning portion; 727. avoidance notch; and

8. noise-canceling microphone.

DETAILED DESCRIPTION OF ILLUSTRATIVE EMBODIMENTS

In the embodiments of this application, the terms "first", "second", and "third" are merely used for description, and cannot be construed as an indication or implication of relative importance or an implicit indication of a quantity of indicated technical features. Therefore, a feature limited by "first", "second", "third", or "fourth" may explicitly or implicitly include one or more features.

In the descriptions of the embodiments of this application, it should be noted that unless otherwise specified and defined explicitly, the terms "mount", "connect", and "connection" should be understood in a general sense. For example, "connection" may be a detachable connection or a non-detachable connection; or may be a direct connection or an indirect connection through an intermediate medium. A "fixed connection" means being connected to each other and a relative location relationship remaining unchanged after connection. A "rotatable connection" means being connected to each other and capable of rotating relative to each other after connection. A "slidable connection" means being connected to each other and capable of sliding relative to each other after connection.

Orientation terms such as "inside" and "outside" mentioned in the embodiments of this application merely refer to directions in the accompanying drawings. Therefore, the used orientation terms are intended for better and clearer description and understanding of the embodiments of this application, and are not intended for indicating or implying that an indicated apparatus or element needs to have a specific orientation or constructed and operated in a specific orientation, and therefore shall not be construed as limitations on the embodiments of this application. In addition, unless otherwise specified in this application, “a plurality of” described in this application means two or more.

In the embodiments of this application, terms “include”, “comprise”, or any other variant thereof is intended to cover non-exclusive inclusion, so that a process, method, article, or apparatus that includes a series of elements not only includes those elements, but also includes other elements that are not explicitly listed, or includes elements inherent to the process, method, article, or apparatus. Without more limitations, elements limited by the sentence “including one . . . ” do not exclude that there are still other same elements in the process, method, article, or apparatus that includes the element.

In the embodiments of this application, “and/or” is merely used to describe an association relationship between associated objects, and indicates that three relationships may exist. For example, A and/or B may indicate the following: Only A exists, both A and B exist, and only B exists. In addition, the character “/” used in this specification usually indicates that there is an “or” relationship between associated objects. It should be noted that an effective vibration area of the diaphragm assembly in this specification refers to an area of a part of the diaphragm assembly capable of pushing air movement.

This application provides an earphone. The earphone can be used in cooperation with an electronic product such as a mobile phone, a tablet computer, or a notebook computer, to receive sound information provided by the electronic product and output the sound information to a user. The earphone is used in cooperation with the electronic product, to prevent external sound playing of the electronic product from interfering with other people. The earphone may be a wireless earphone or may be a wired earphone.

Figure 2:
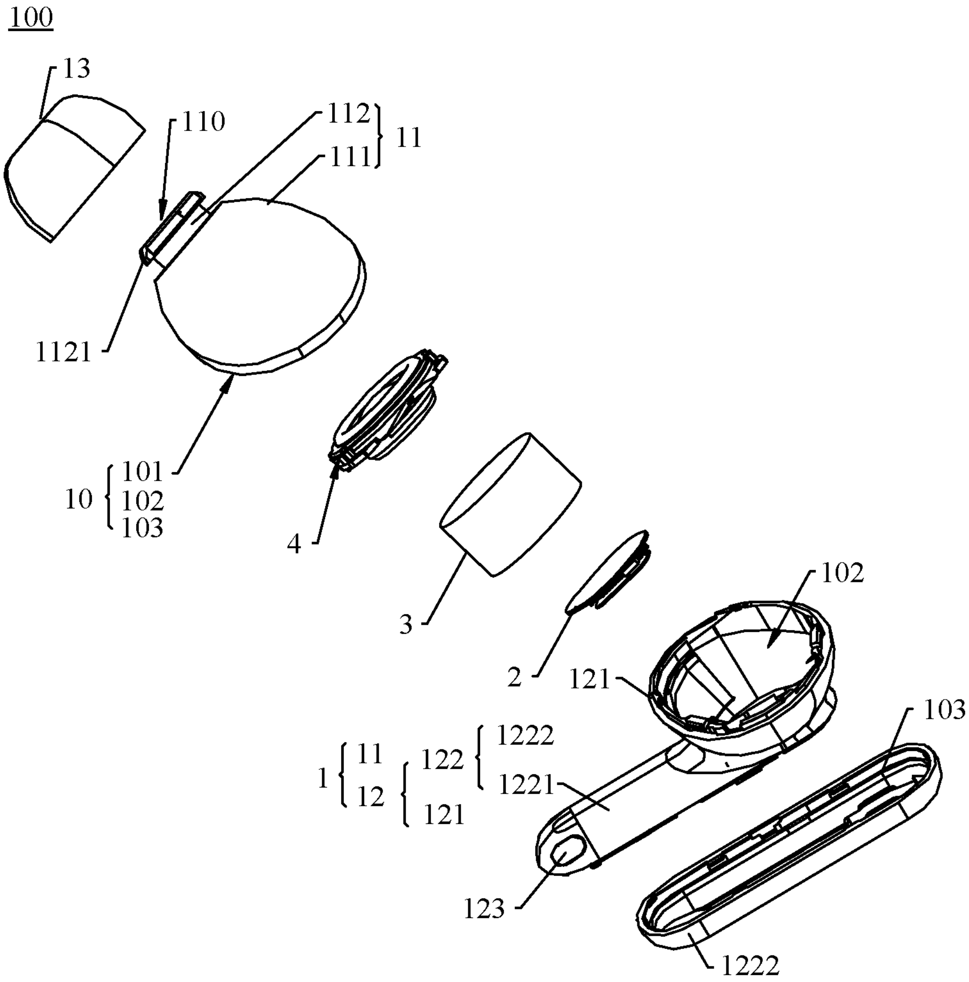
FIG. 2 is a schematic diagram of a decomposed structure of the earphone shown in FIG. 1.

Referring to FIG. 1 and FIG. 2, FIG. 1 is a schematic diagram of a structure of an earphone 100 according to some embodiments of this application, and FIG. 2 is a schematic diagram of a decomposed structure of the earphone 100 shown in FIG. 1. The earphone 100 shown in FIG. 1 and FIG. 2 is described by using a wireless earphone as an example. In this embodiment, the earphone 100 may include a housing 1, a main board 2, a battery 3, a wireless communication module (not shown in the figure), and a moving coil speaker unit 4.

It can be understood that FIG. 1, FIG. 2, and the following related accompanying drawings merely show examples of some components included in the earphone 100. Actual shapes, actual sizes, actual locations, and actual structures of these components are not limited by FIG. 1, FIG. 2, and the following accompanying drawings. In addition, when the earphone 100 is a wired earphone, the wired earphone may not include the battery 3 and the wireless communication module.

The housing 1 has accommodating space 10, and functional components such as the main board 2, the battery 3, the wireless communication module, and the moving coil speaker unit 4 may be disposed in the accommodating space 10 of the housing 1. In this way, the housing 1 may serve as a bearer of the functional component in the earphone 100 to protect the functional component located in the accommodating space 10 of the housing 1. In addition, when a user wears the earphone 100, the earphone 100 is in contact with the user’s ear through the housing 1. Therefore, to improve the comfort of the user in wearing the earphone 100, appearance of the housing 1 may match a shape of a human ear.

The housing 1 is directly exposed to an external environment to be in contact with a human ear, or the earphone 100 is in contact with other external structures through the housing 1. Therefore, an outer surface of the housing 1 is inevitably scratched or corroded. To avoid this technical problem, the housing 1 may have specific properties such as abrasion resistance, corrosion resistance, and scratch resistance, or a functional material used for abrasion resistance, corrosion resistance, and scratch resistance may be coated on the outer surface of the housing 1.

In some embodiments, the housing 1 may serve as an integrated structure, that is, the housing 1 may be an integrally formed member, and the integrally formed housing 1 has higher structural strength. In some other embodiments, the housing 1 may be formed by assembling a plurality of parts. Still referring to FIG. 1 and FIG. 2, in this embodiment, the housing 1 may include a front housing 11 and a rear housing 12. The front housing 11 faces a human ear during use of the earphone 100, and the rear housing 12 is away from the human ear during use of the earphone 100. The front housing 11 is detachably connected to the rear housing 12. The front housing 11 and the rear housing 12 may define the accommodating space 10 after being assembled. This can facilitate separate processing of the front housing 11 and the rear housing 12, which helps simplify mold structures of the front housing 11 and the rear housing 12, thereby reducing difficulty of molding the front housing 11 and the rear housing 12, and further reducing difficulty of processing and manufacturing the housing 1. In addition, this also helps detach the front housing 11 from the rear housing 12 to facilitate maintenance of the earphone 100. Specifically, the front housing 11 may be fixedly connected to the rear housing 12 through buckling, or the front housing 11 may be connected to the rear housing 12 through a screw. Alternatively, in another implementation, the front housing 11 may be fixedly connected to the rear housing 12 through adhering.

A material of the front housing 11 includes but is not limited to hard plastic, metal, and a combination of plastic and metal. To achieve a lightweight of the earphone 100, the material of the front housing 11 may be hard plastic.

Referring to FIG. 2, the front housing 11 may include a main portion 111 and a sound outlet 112. A first accommodating cavity 101 may be formed in the main portion 111, and a side that is of the first accommodating cavity 101 and that is adjacent to the rear housing 12 is open. The sound outlet 112 may be located on a side that is of the main portion 111 and that is away from the rear housing 12 and extend in a direction away from the rear housing 12. The sound outlet 112 communicates with the first accommodating cavity 101, and a sound output hole 110 is formed at an end that is of the sound outlet 112 and that is away from the main portion 111. The sound outlet 112 is disposed and the sound output hole 110 is disposed on the sound outlet 112, so that the sound outlet 112 can more easily extend into an ear canal of a human ear to shorten a distance between the sound output hole 110 of the earphone 100 and an eardrum of the human ear. Therefore, a sound produced by the earphone 100 is well received by a user, thereby improving use experience of the user.

The main portion 111 and the sound outlet 112 may be integrally formed. In this way, strength of connection between the main portion 111 and the sound outlet 112 can be improved, thereby simplifying a processing technique and reducing production costs.

Certainly, in another example, the main portion 111 and the sound outlet 112 may be separately processed and then connected through buckling, screw connection, welding, adhering, or the like. This can facilitate separate processing of the main portion 111 and the sound outlet 112, which helps simplify mold structures of the main portion 111 and the sound outlet 112, thereby reducing difficulty of forming the main portion 111 and the sound outlet 112, and further reducing difficulty of processing and manufacturing the front housing 11.

It can be understood that in some other embodiments, the front housing 11 may not include the sound outlet 112, and the sound output hole 110 is directly disposed on a wall surface of the main portion 111.

To improve the comfort of a user in wearing the earphone 100, still referring to FIG. 1 and FIG. 2, the earphone 100 may also be provided with a contact sleeve 13. The contact sleeve 13 may be configured to be in contact with a user's ear. For example, the contact sleeve 13 may be disposed around an outer peripheral surface of the sound outlet 112, and appearance of the contact sleeve 13 may be similar to a shape of an ear canal of a human body, to improve the performance of cooperation in wearing the earphone 100. A material of the contact sleeve 13 includes but is not limited to silica gel and rubber, to improve the comfort of a user in wearing the earphone 100.

Referring to FIG. 2, a limiting convex rib 1121 may be formed at an end that is of the outer peripheral surface of the sound outlet 112 and that is away from the main portion 111. In this way, when the contact sleeve 13 is disposed around the outer peripheral surface of the sound outlet 112, a part of the contact sleeve 13 can abut against between the limiting convex rib 1121 and the main portion 111, to limit the contact sleeve 13, thereby reducing a probability that the contact sleeve 13 naturally falls off the sound outlet 112. Certainly, to reduce costs, the earphone 100 may not include the contact sleeve 13.

A material of the rear housing 12 may be the same as the material of the front housing 11. Certainly, the material of the rear housing 12 may be different from the material of the front housing 11. To achieve a lightweight of the earphone 100, the material of the rear housing 12 may be hard plastic.

Still referring to FIG. 2, the rear housing 12 may include a cover body 121 and a rod body 122. The cover body 121 may be connected to the front housing 11, and the rod body 122 may be disposed on a side that is of the cover body 121 and that is away from the front housing 11. A second accommodating cavity 102 may be formed in the cover body 121, and a side that is of the second accommodating cavity 102 and that is adjacent to the front housing 11 is open, so that the second accommodating cavity 102 can communicate with the first accommodating cavity 101. The rod body 122 has a third accommodating cavity 103. The third accommodating cavity 103 communicates with the second accommodating cavity 102. In addition, the third accommodating cavity 103, the second accommodating cavity 102, and the first accommodating cavity 101 may jointly form the accommodating space 10 of the housing 1.

The rod body 122 includes a front rod body 1221 and a rear rod body 1222, the front rod body 1221 is fastened on the cover body 121, and the front rod body 1221 and the cover body 121 may be an integrated structure. This can simplify a technique of processing and manufacturing the rear housing 12 and improve strength of connection between the cover body 121 and the front rod body 1221. The rear rod body 1222 is detachably disposed on a side that is of the front rod body 1221 and that is away from the main portion 111, and the front rod body 1221 cooperates with the rear rod body 1222 to define the third accommodating cavity 103. The front rod body 1221 and the rear rod body 1222 may be connected through adhering, clamping, screw connection, or the like.

The main board 2 may be accommodated in the accommodating space 10 of the housing 1. Specifically, the main board 2 may be mounted in the second accommodating cavity 102. A manner of mounting the main board 2 in the housing 1 includes but is not limited to clamping, screw connection, or adhering.

The main board 2 is configured to integrate a control chip and the like. The control chip may be, for example, an application processor (application processor, AP), a double data rate (double data rate, DDR) synchronous dynamic random access memory, and a universal flash storage (universal flash storage, UFS). The main board 2 is electrically connected to all functional components such as the wireless communication module, the battery 3, and the moving coil speaker unit 4, to perform operations such as signal control and data signal processing between different functional components.

The main board 2 may be a rigid printed circuit, may be a flexible printed circuit (flexible printed circuit, FPC), or may be a rigid-flex printed circuit. The main board 2 may be an FR- dielectric board, may be a Rogers (Rogers) dielectric board, may be a dielectric board mixing FR- and Rogers, or the like. Herein, FR- is a code name of a level of a flame-retardant material, and the Rogers dielectric board is a high-frequency board.

The wireless communication module (not shown in the figure) may be integrated on the main board 2. For example, the wireless communication module may be fastened on the main board 2 through welding. Optionally, the wireless communication module may be a Bluetooth, or an infrared or wifi module. The earphone 100 may exchange a wireless signal with an electronic product by using the wireless communication module, to receive sound information of the electronic product.

The battery 3 is configured to supply power to functional components such as the main board 2, the wireless communication module, and the moving coil speaker unit 4 in the earphone 100. The battery 3 may include but is not limited to a nickel-cadmium battery, a NiMH battery, a lithium battery, or other types of batteries. In addition, there may be one or more batteries 3 in this embodiment of this application. A shape of the battery 3 includes but is not limited to a cuboid, a cylinder, a frustum, or the like. In some examples, the battery 3 may be located in the second accommodating cavity 102, and the battery 3 is located on a side that is of the main board 2 and that is close to the first accommodating cavity 101. In another example, the battery 3 is located in the second accommodating cavity 102, and the battery 3 is located on a side that is of the main board 2 and that is away from the first accommodating cavity 101. A manner of mounting the battery 3 in the housing 1 includes but is not limited to clamping, screw connection, or adhering.

To charge the battery 3, in some examples, referring to FIG. 1 and FIG. 2, a charging contact 123 is disposed on the rod body 122. A charging line (not shown in the figure) is disposed in the third accommodating cavity 103, and the charging line electrically connects the charging contact 123 to the main board 2 in the second accommodating cavity 102. When the charging contact 123 is electrically connected to an interface of an external power supply, the external power supply can charge the earphone 100.

Still referring to FIG. 2, the moving coil speaker unit 4 may be mounted in the first accommodating cavity 101, so that the moving coil speaker unit 4 is located on a side that is of the battery 3 and that is close to the sound output hole 110. The moving coil speaker unit 4 may be disposed close to the sound output hole 110, to help improve a sound output effect. A manner of assembling the moving coil speaker unit 4 and the housing 1 includes but is not limited to clamping, thread connection, adhering, and the like. The moving coil speaker unit 4 is electrically connected to the main board 2 to obtain an audio electrical signal such as music or a voice, and the moving coil speaker unit 4 can convert the audio electrical signal into a sound signal to support external audio playing.

Figure 3:
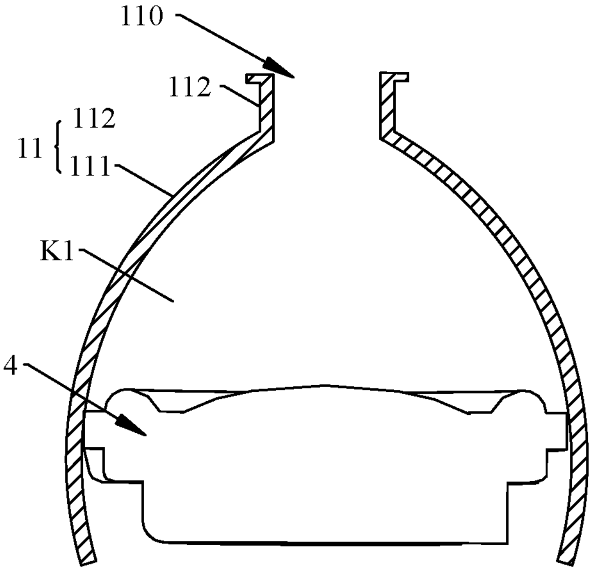
FIG. 3 is a schematic diagram of a cross-sectional structure obtained after cooperation based on a front housing and a moving coil speaker unit in the earphone shown in FIG. 1-FIG. 2.

Referring to FIG. 3, FIG. 3 is a schematic diagram of a cross-sectional structure obtained after cooperation based on the front housing 11 and the moving coil speaker unit 4 in the earphone 100 shown in FIG. 1-FIG. 2. A cavity that is of the front housing 11 and that is located between the moving coil speaker unit 4 and the sound output hole 110 may form a front cavity K1 of the moving coil speaker unit 4.

The moving coil speaker unit 4 used in the embodiment shown in FIG. 1-FIG. 3 is a woofer. This enables the earphone 100 to have performance of a low-frequency sound range, and makes the earphone 100 affordable. However, the moving coil speaker unit 4 has a large vibration mass and a poor transient feature, and mass distribution, diaphragm compliance, and asymmetric distribution of BL electromagnetic driving force may generate different degrees of rocking vibration and different frequencies of split vibration. As a result, a high-frequency response generates a serious peak and valley, and performance of a high-frequency sound range cannot be implemented. Consequently, performance of the earphone 100 in externally playing audio is relatively poor and a sound effect is not good. Moreover, the front cavity K1 of the moving coil speaker unit 4 is formed by the cavity that is of the front housing 11 and that is located between the moving coil speaker unit 4 and the sound output hole 110, and a volume of the front cavity K1 is relatively large, which is less conducive to performance of the moving coil speaker unit 4 in the high-frequency sound range.

Figure 4:
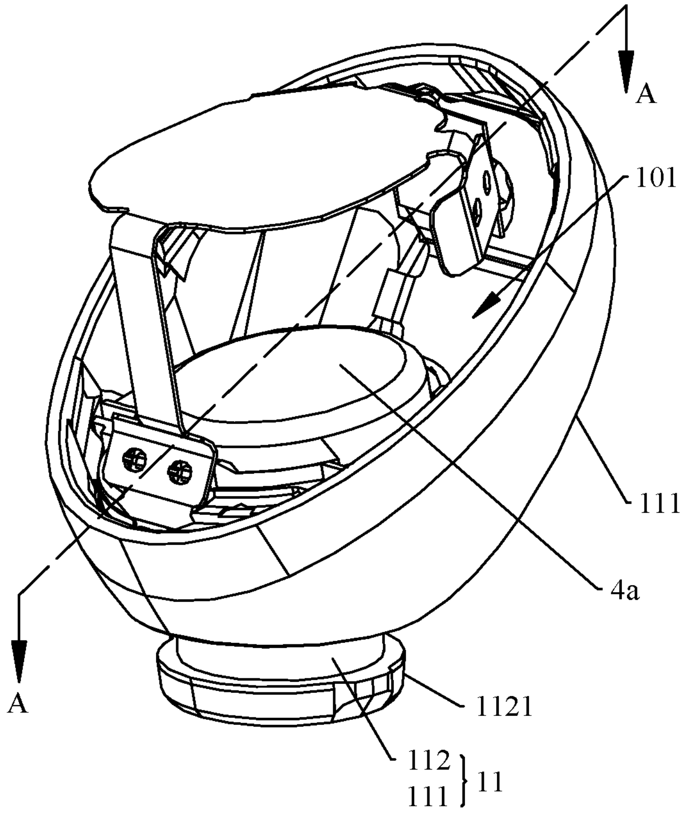
FIG. 4 is a schematic diagram of a partial structure of an earphone according to some other embodiments of this application.
Figure 5:
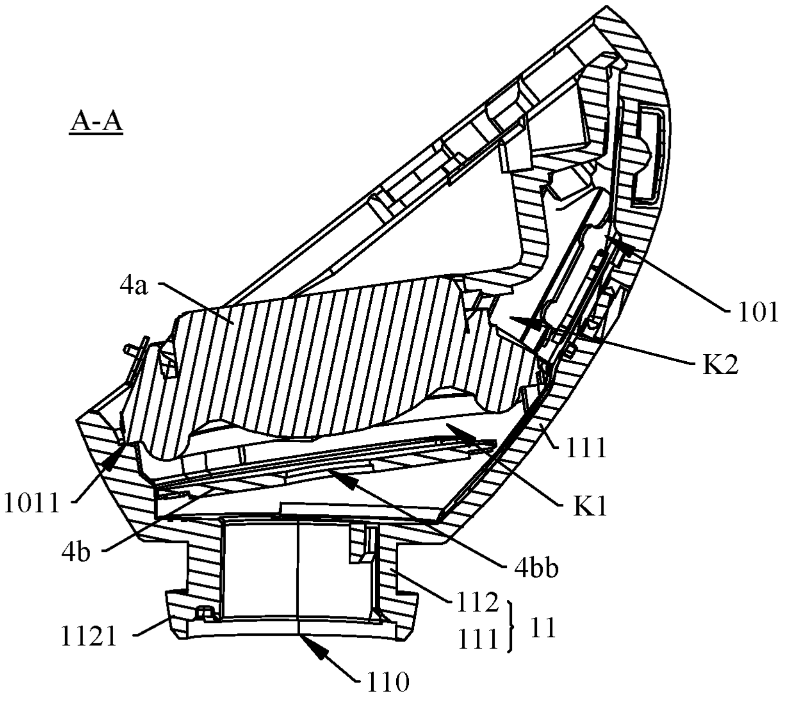
FIG. 5 is a schematic diagram of a cross section along a line A-A based on the partial structure of the earphone shown in FIG. 4.

Referring to FIG. 4 and FIG. 5, FIG. 4 is a schematic diagram of a partial structure of an earphone 100 according to some other embodiments of this application, and FIG. 5 is a schematic diagram of a cross section along a line A-A based on the partial structure of the earphone 100 shown in FIG. 4. In this embodiment, the earphone 100 no longer includes only one moving coil speaker unit 4, but includes two speaker units: a first speaker unit 4*b* and a second speaker unit 4*a*.

It can be understood that FIG. 4, FIG. 5, and the following related accompanying drawings merely show examples of some components included in the earphone 100. Actual sizes, actual positions, and actual structures of these components are not limited by FIG. 4, FIG. 5, and the following accompanying drawings.

The first speaker unit 4*b* and the second speaker unit 4*a* are separately independently fastened in the housing 1. Specifically, the first speaker unit 4*b* and the second speaker unit 4*a* are separately independently fastened in first accommodating space.

It should be noted that "the first speaker unit 4*b* and the second speaker unit 4*a* are separately independently fastened in the housing 1" means the following: The first speaker unit 4*b* and the second speaker unit 4*a* are not fastened in the housing 1 as a whole, and instead, the first speaker unit 4*b* and the second speaker unit 4*a* are separately mounted and independently fastened in the housing 1. There is a sequence for mounting the first speaker unit 4*b* and the second speaker unit 4*a* in the housing 1. For example, after the first speaker unit 4*b* is fastened in the housing 1, the second speaker unit 4*a* is fastened in the housing 1. For another example, after the second speaker unit 4*a* is fastened in the housing 1, the first speaker unit 4*b* is fastened in the housing 1.

In the earphone 100 in this embodiment of this application, the first speaker unit 4*b* and the second speaker unit 4*a* are separately independently fastened in the housing 1. Therefore, when one of the first speaker unit 4*b* and the second speaker unit 4*a* is damaged due to a fault, only the damaged one needs to be detached for replacement or maintenance, to avoid that the first speaker unit 4*b* and the second speaker unit 4*a* need to be integrally detached for replacement due to modularization of the first speaker unit 4*b* and the second speaker unit 4*a*, thereby helping reduce maintenance costs, and further avoiding damage caused to the speaker unit that does not need to be replaced during detachment.

In addition, compared with the design in which the first speaker unit 4*b* and the second speaker unit 4*a* are modularized, when the first speaker unit 4*b* and the second speaker unit 4*a* are independently fastened in the housing 1, a connecting piece between the first speaker unit 4*b* and the second speaker unit 4*a* is omitted, and only a physical connection needs to be implemented by using the housing 1 as the connecting piece between the first speaker unit 4*b* and the second speaker unit 4*a*. This helps save space in the housing 1, thereby facilitating integration of more functional components in the earphone 100, and further facilitating proper optimization of a structural layout in the earphone 100.

The second speaker unit 4*a* is located on a side that is of the first speaker unit 4*b* and that is away from the sound output hole 110, and the second speaker unit 4*a* is spaced apart from the first speaker unit 4*b*. The first speaker unit 4*b* and the second speaker unit 4*a* each produce a sound toward the sound output hole 110. A sound production frequency of the first speaker unit 4*b* is higher than a sound production frequency of the second speaker unit 4*a*. In this way, the earphone 100 includes the first speaker unit 4*b* and the second speaker unit 4*a* having different sound production frequencies, so that a sound production frequency difference between the first speaker unit 4*b* and the second speaker unit 4*a* can be used to enable the earphone 100 to have a relatively good sound expression in sound ranges of different frequencies, thereby improving a sound output effect of the earphone 100.

In this embodiment, the first speaker unit 4*b* serves as a tweeter. Specifically, the first speaker unit 4*b* may be a piezoelectric ceramic speaker unit. The second speaker unit 4*a* may be a woofer or a mid-low range speaker. Specifically, the second speaker unit 4*a* may be the moving coil speaker unit 4 shown in FIG. 1-FIG. 3. Certainly, it can be understood that in another example, the second speaker unit 4*a* may be alternatively a moving iron speaker unit or a planar voice coil speaker unit.

Still referring to FIG. 5, a cavity may be enclosed by the first speaker unit 4*b*, the second speaker unit 4*a*, and an inner wall of the housing 1. The cavity serves as a front cavity K1 of the second speaker unit 4*a*, and the front cavity K1 communicates with the sound output hole 110 through a sound output channel 4*bb*. In this way, compared with the embodiment shown in FIG. 1-FIG. 3 in which the moving coil speaker unit 4 is separately disposed in the housing 1 of the earphone 100, the cavity enclosed by the first speaker unit 4*b*, the second speaker unit 4*a*, and the inner wall of the housing 1 is used as the front cavity K1 of the second speaker unit 4*a*, which helps reduce a volume of the front cavity K1, thereby improving, to at least a specific extent, a high-frequency effect of the second speaker unit 4*a* in a specific high frequency band. In addition, the structure is compact. Moreover, the feature that the sound production frequency of the first speaker unit 4*b* is higher than the sound production frequency of the second speaker unit 4*a* may be used to further improve a high frequency loss of the earphone 100 in the foregoing embodiment, so that the earphone 100 has a relatively good sound expression in sound ranges of different frequencies, thereby improving a sound output effect of the earphone 100.

Figure 6:
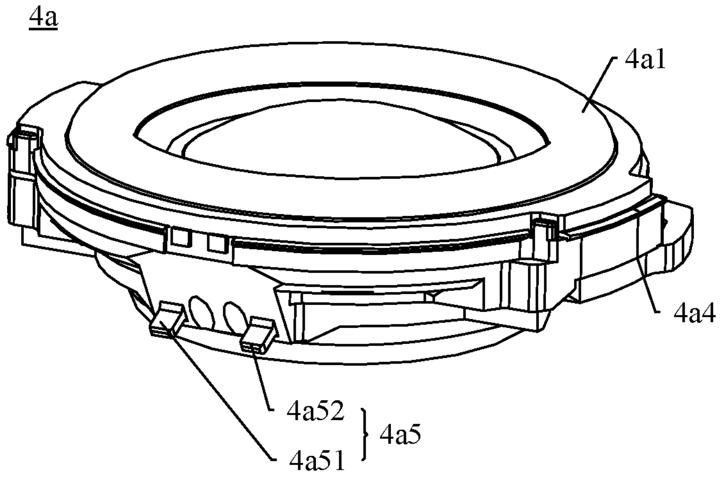
FIG. 6 is a three-dimensional diagram based on a second speaker unit in the earphone shown in FIG. 4-FIG. 5.
Figure 7:
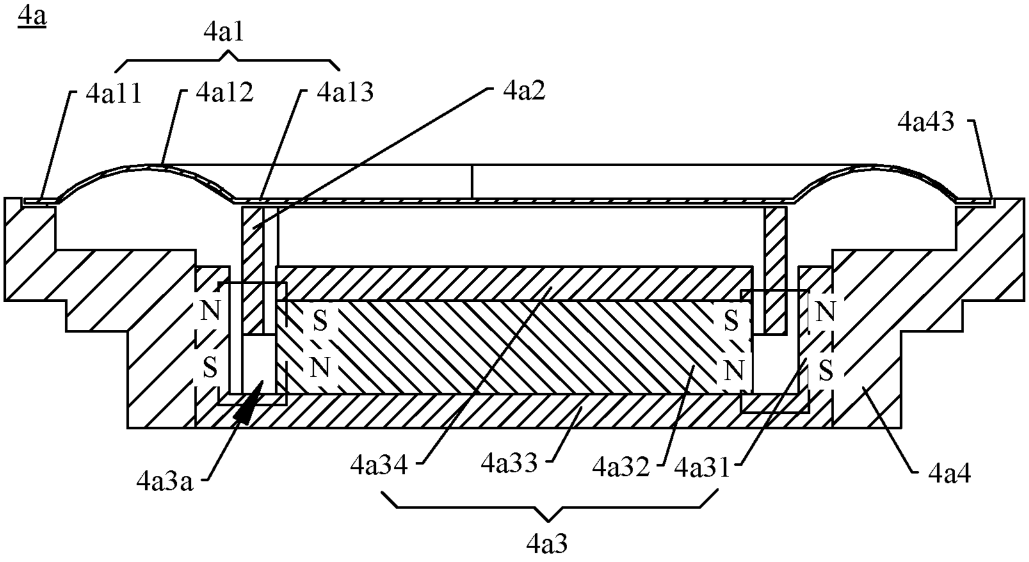
FIG. 7 is a schematic diagram of a cross section based on the second speaker unit shown in FIG. 6.

Referring to 6 and FIG. 7, FIG. 6 is a three-dimensional diagram based on the second speaker unit 4*a* in the earphone 100 shown in FIG. 4-FIG. 5, and FIG. 7 is a schematic diagram of a cross section of the second speaker unit 4*a* shown in FIG. 6. In this embodiment, the second speaker unit 4*a* is a moving coil speaker unit and includes a diaphragm assembly 4*a*1, a voice coil 4*a*2, a magnetic circuit system 4*a*3, a basin frame 4*a*4, and a wiring terminal 4*a*5.

It can be understood that FIG. 6, FIG. 7, and the following related accompanying drawings merely show examples of some components included in the second speaker unit 4*a*. Actual sizes, actual locations, and actual structures of these components are not limited by FIG. 6, FIG. 7, and the following accompanying drawings.

Specifically, the second speaker unit 4*a* is fastened in the housing 1 (for example, the first accommodating cavity 101) by using the basin frame 4*a*4. A manner of assembling the basin frame 4*a*4 and the housing 1 includes but is not limited to clamping, thread connection, adhering, and the like. For example, a support step 1011 (with reference to FIG. 5) is formed on an inner peripheral wall of the first accommodating cavity 101, and the second speaker unit 4*a* is supported and fastened on the support step 1011 by using the basin frame 4*a*4, to facilitate positioning and mounting of the second speaker unit 4*a*.

A side that is of the basin frame 4*a*4 and that faces the sound output hole 110 is open. The basin frame 4*a*4 serves as a "support skeleton" of the second speaker unit 4*a* to support the diaphragm assembly 4*a*1, the voice coil 4*a*2, and the magnetic circuit system 4*a*3. A material of the basin frame 4*a*4 includes but is not limited to metal, plastic, and a combination of metal and plastic. The basin frame 4*a*4 may be an integrally formed member, that is, the basin frame 4*a*4 is an integrated structure. This helps improve connection strength of the basin frame 4*a*4.

Certainly, this application is not limited thereto. The basin frame 4*a*4 may be alternatively formed by assembling different parts, and a plurality of different parts may be connected through clamping, thread connection, adhering, welding, or the like.

Still referring to FIG. 7, the diaphragm assembly 4*a*1 is fastened at the open end of the basin frame 4*a*4. Specifically, an inner peripheral surface of the open end of the basin frame 4*a*4 is provided with an annular groove 4*a*43 that is recessed in a direction away from a central axis of the basin frame 4*a*4. The annular groove 4*a*43 extends in an annular shape along a circumferential direction of the basin frame 4*a*4, and an end surface that is of the annular groove 4*a*43 and that extends to the open end of the basin frame 4*a*4 is an end surface at an end facing the sound output hole 110. An outer edge of the diaphragm assembly 4*a*1 is accommodated in the annular groove 4*a*43 and fastened on a wall surface that is of the annular groove 4*a*43 and that directly faces the sound output hole 110.

In this embodiment of this application, the outer edge of the diaphragm assembly 4*a*1 is accommodated in the annular groove 4*a*43 and fastened on the wall surface that is of the annular groove 4*a*43 and that directly faces the sound output hole 110, which helps effectively support the diaphragm assembly 4*a*1 by using the annular groove 4*a*43. In addition, disposing of the annular groove 4*a*43 can increase a volume of space in the basin frame 4*a*4, which helps set a larger size of the diaphragm assembly 4*a*1, thereby helping enlarge an effective vibration area of the diaphragm assembly 4*a*1 and improving a sound output effect of the second speaker unit 4*a*. It can be understood that the annular groove 4*a*43 may not be disposed in the basin frame 4*a*4, and the outer edge of the diaphragm assembly 4*a*1 may be fixedly connected to the end surface at the open end of the basin frame 4*a*4.

In this way, the front cavity K1 of the second speaker unit 4*a* may be enclosed by the diaphragm assembly 4*a*1, the first speaker unit 4*b*, and the inner wall of the housing 1. It can be understood that a rear cavity K2 of the second speaker unit 4*a* is located on a side that is of the diaphragm assembly 4*a*1 and that is away from the front cavity K1. The voice coil 4*a*2, the magnetic circuit system 4*a*3, and the basin frame 4*a*4 are located in the rear cavity K2.

Still referring to FIG. 7, the diaphragm assembly 4*a*1 includes a connecting section 4*a*11, a corrugated rim 4*a*12, and a dome 4*a*13 surrounded by the corrugated rim 4*a*12.

The connecting section 4*a*11 is in a shape of an annular sheet, for example, the connecting section 4*a*11 is a circular ring or a rectangular ring. The connecting section 4*a*11 is disposed through laminating on the wall surface that is of the annular groove 4*a*43 and that directly faces the sound output hole 110, so that the diaphragm assembly 4*a*1 is connected to the basin frame 4*a*4 by using the connecting section 4*a*11. A manner of connecting the connecting section 4*a*11 and the annular groove 4*a*43 includes but is not limited to adhering, clamping, welding, or screw connection.

An outer peripheral edge of the corrugated rim 4*a*12 is connected to an inner peripheral edge of the connecting section 4*a*11. A cross-sectional shape of the corrugated rim 4*a*12 is arc-shaped or approximately arc-shaped. The corrugated rim 4*a*12 has a circular or rectangular extending track along the circumferential direction of the basin frame 4*a*4. The corrugated rim 4*a*12 protrudes toward a direction of the sound output hole 110.

In this way, the corrugated rim 4*a*12 can be deformed when subjected to external force, so that the dome 4*a*13 can vibrate along an axial direction of the diaphragm assembly 4*a*1 relative to the connecting section 4*a*11, which helps further decrease the volume of the front cavity K1. Certainly, it can be understood that the corrugated rim 4*a*12 may alternatively protrude toward a direction away from the sound output hole 110.

In some examples, the diaphragm assembly 4*a*1 is an integrally formed member, that is, the connecting section 4*a*11, the corrugated rim 4*a*12, and the dome 4*a*13 are an integrated structure. This disposing helps improve structural strength of the diaphragm assembly 4*a*1 and facilitates processing and manufacturing of the diaphragm assembly 4*a*1. Certainly, this application is not limited thereto. The connecting section 4*a*11, the corrugated rim 4*a*12, and the dome 4*a*13 may be separately formed members, the connecting section 4*a*11 and the corrugated rim 4*a*12 may be connected through adhering, and the corrugated rim 4*a*12 and the dome 4*a*13 may be connected through adhering. A material of the diaphragm assembly 4*a*1 includes but is not limited to metal, plastic, plant fiber, and animal fiber.

The voice coil 4*a*2 is connected to a surface on a side that is of the dome 4*a*13 and that is away from the sound output hole 110. A manner of connecting the voice coil 4*a*2 and the dome 4*a*13 includes but is not limited to adhering.

The magnetic circuit system 4*a*3 is fastened in the basin frame 4*a*4. The magnetic circuit system 4*a*3 has an annular magnetic gap 4*a*3*a*, and an end that is of the voice coil 4*a*2 and that is away from the diaphragm assembly 4*a*1 may extend into the magnetic gap 4*a*3*a*, so that the magnetic circuit system 4*a*3 can cooperate with the voice coil 4*a*2 to drive the diaphragm assembly 4*a*1 to vibrate synchronously. Specifically, after the voice coil 4*a*2 is powered on, an induced magnetic field may be generated, and the magnetic circuit system 4*a*3 may respond to the induced magnetic field, so that the voice coil 4*a*2 is displaced under action of magnetic force of the magnetic circuit system 4*a*3, to drive the diaphragm assembly 4*a*1 to vibrate to push air in the front cavity K1 to vibrate to form a sound, where the sound is output from the sound output hole 110.

Still referring to FIG. 7, the magnetic circuit system 4*a*3 includes an edge magnetic portion 4*a*31, a first central magnetic portion 4*a*32, and a second central magnetic portion 4*a*33. The edge magnetic portion 4*a*31 is located at an outer circumference of the first central magnetic portion 4*a*32 to define the magnetic gap 4*a*3*a* with the first central magnetic portion 4*a*32. A magnetizing direction of the edge magnetic portion 4*a*31 is opposite to a magnetizing direction of the first central magnetic portion 4*a*32, so that the edge magnetic portion 4*a*31 and the first central magnetic portion 4*a*32 can form a magnetic loop for driving the voice coil 4*a*2 to move. For example, along an axial direction of the basin frame 4*a*4 and facing a direction away from the diaphragm assembly 4*a*1, the magnetizing direction of the edge magnetic portion 4*a*31 is from a north pole (N) to a south pole(S), and the magnetizing direction of the first central magnetic portion 4*a*32 is from the south pole(S) to the north pole (N).

Still referring to FIG. 7, the edge magnetic portion 4*a*31 may be formed in an annular shape, for example, the edge magnetic portion 4*a*31 is formed as a circular ring or a rectangular ring. Certainly, it can be understood that the edge magnetic portion 4*a*31 may alternatively be non-annular. There are a plurality of edge magnetic portions 4*a*31, and the plurality of edge magnetic portions 4*a*31 are spaced apart in a circumferential direction of the first central magnetic portion 4*a*32.

The second central magnetic portion 4*a*33 blocks an end that is of the edge magnetic portion 4*a*31 and that is away from the diaphragm assembly 4*a*1, and the first central magnetic portion 4*a*32 and the second central magnetic portion 4*a*33 are disposed through laminating. The second central magnetic portion 4*a*33 and the edge magnetic portion 4*a*31 may be integrally formed, that is, the second central magnetic portion 4*a*33 and the edge magnetic portion 4*a*31 may be an integrated structure. Certainly, this application is not limited thereto. The second central magnetic portion 4*a*33 and the edge magnetic portion 4*a*31 may be connected through adhering, clamping, thread connection, or the like.

Specifically, the second central magnetic portion 4*a*33 may be a member made of a magnetoconductive material. In this way, leakage of a magnetic line may be restricted by using the second central magnetic portion 4*a*33, to increase magnetic induction strength of the magnetic circuit system 4*a*3. Certainly, this application is not limited thereto. In some other examples, the second central magnetic portion 4*a*33 may be a magnetic body. Specifically, the magnetic body is a magnet or magnetic steel.

In some examples, both the edge magnetic portion 4*a*31 and the first central magnetic portion 4*a*32 may be magnetic bodies, for example, both the edge magnetic portion 4*a*31 and the first central magnetic portion 4*a*32 are magnets or magnetic steel. Certainly, this application is not limited thereto. In another embodiment, one of the edge magnetic portion 4*a*31 and the first central magnetic portion 4*a*32 is a magnetic body, and the other one is a member made of a magnetoconductive material.

To increase magnetic induction strength of the magnetic circuit system 4*a*3, the magnetic circuit system 4*a*3 further includes a magnetically conductive yoke 4*a*34. The magnetically conductive yoke 4*a*34 is disposed on a side that is of the first central magnetic portion 4*a*32 and that faces the diaphragm assembly 4*a*1, and is configured to restrict leakage of the magnetic line, to improve driving force for the diaphragm assembly 4*a*1.

Specifically, an outer peripheral surface of the magnetically conductive yoke 4*a*34 is flush with an outer peripheral surface of the first central magnetic portion 4*a*32 in an axial direction of the magnetic circuit system 4*a*3. This helps further improve a restriction effect of the magnetically conductive yoke 4*a*34 on the magnetic line, and increase magnetic induction strength of the magnetic circuit system 4*a*3. In addition, the magnetic gap 4*a*3*a* is not affected by the magnetically conductive yoke 4*a*34, which helps improve performance of cooperation between the magnetic circuit system 4*a*3 and the voice coil 4*a*2.

Referring to FIG. 6, the wiring terminal 4*a*5 is disposed on the basin frame 4*a*4. Specifically, the wiring terminal 4*a*5 is located outside the basin frame 4*a*4. For example, the wiring terminal 4*a*5 may protrude from an outer peripheral surface of the basin frame 4*a*4. For another example, a groove may be formed on the outer peripheral surface of the basin frame 4*a*4, and the wiring terminal 4*a*5 may be located in the groove. A manner of disposing the wiring terminal 4*a*5 may be designed by persons skilled in the art based on an actual requirement, provided that it is ensured that the wiring terminal 4*a*5 is located outside the basin frame 4*a*4.

The wiring terminal 4*a*5 includes a positive wiring terminal 4*a*52 and a negative wiring terminal 4*a*51. A part that is of the positive wiring terminal 4*a*52 and that is located in the basin frame 4*a*4 is electrically connected to a positive lead of the voice coil 4*a*2. In some examples, the part that is of the positive wiring terminal 4*a*52 and that is located in the basin frame 4*a*4 may be connected to the positive lead of the voice coil 4*a*2 through welding. A part that is of the negative wiring terminal 4*a*51 and that is located in the basin frame 4*a*4 may be electrically connected to a negative lead of the voice coil 4*a*2. In some examples, the part that is of the negative wiring terminal 4*a*51 and that is located in the basin frame 4*a*4 may be connected to the negative lead of the voice coil 4*a*2 through welding. This helps power on the voice coil 4*a*2.

Figure 8:
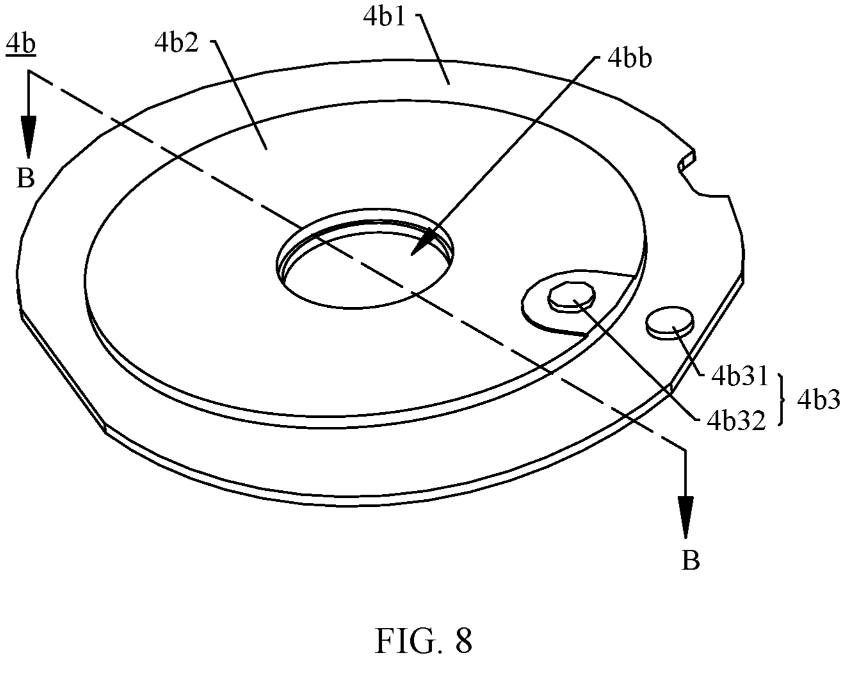
FIG. 8 is a three-dimensional diagram based on a first speaker unit in the earphone shown in FIG. 4-FIG. 5.

Referring to FIG. 8, FIG. 8 is a three-dimensional diagram based on the first speaker unit 4*b* in the earphone 100 shown in FIG. 4-FIG. 5. In this embodiment, the first speaker unit 4*b* is a piezoelectric ceramic speaker unit. In this embodiment of this application, the piezoelectric ceramic speaker unit is small in thickness and small in volume, and has a fairly good high-frequency sound effect.

To facilitate communication between the front cavity K1 and the sound output hole 110, the sound output channel 4*bb* may be formed on the first speaker unit 4*b*. Specifically, referring to FIG. 8, there is one sound output channel **4*bb*, and the first speaker unit 4*b* is annular to define the sound output channel 4*bb***.

Further, to improve a sound output effect of the sound output channel **4*bb*, the first speaker unit 4*b* is disposed coaxially with the second speaker unit 4*a*, and the sound output channel 4*bb* is located in the middle of the first speaker unit 4*b*. In this way, the diaphragm assembly 4*a*1 vibrates to push air in the front cavity K1 to vibrate to produce a sound, which can be transferred through the sound output channel 4*bb* toward the sound output hole 110**.

In some other examples, there may be a plurality of sound output channels **4*bb*, the plurality of sound output channels 4*bb* are formed in the first speaker unit 4*b*, and the plurality of sound output channels 4*bb* are spaced apart. Certainly, this application is not limited thereto. In another example, the sound output channel 4*bb* may be formed between an outer peripheral edge of the first speaker unit 4*b* and the inner wall of the housing 1**.

Figure 9:
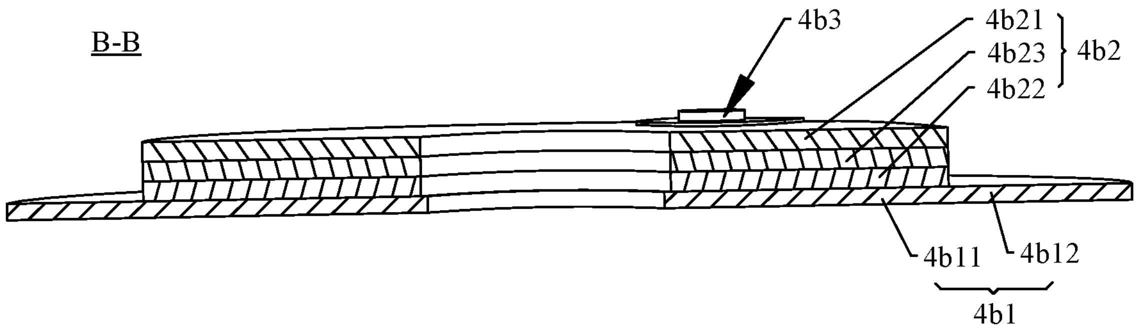
FIG. 9 is a schematic diagram of a cross section along a line B-B based on the first speaker unit shown in FIG. 8.

Still referring to FIG. 8 and FIG. 9, FIG. 9 is a schematic diagram of a cross section along a line B-B based on the first speaker unit **4*b* shown in FIG. 8. The first speaker unit 4*b* includes a vibration plate 4*b*1 and a piezoelectric ceramic sheet 4*b*2**.

It can be understood that FIG. 8, FIG. 9, and the following related accompanying drawings merely show examples of some components included in the first speaker unit **4*b*. Actual shapes, actual sizes, actual locations, and actual structures of these components are not limited by FIG. 8, FIG. 9**, and the following accompanying drawings.

The vibration plate **4*b*1 is in a shape of an annular flat plate, for example, the vibration plate 4*b*1 is in a shape of a circular flat plate, in a shape of a squircle flat plate, or in a shape of an odd-formed annular flat plate. An outer peripheral contour of the vibration plate 4*b*1 is adapted to an inner wall surface of the housing 1**.

The vibration plate **4*b*1 is disposed opposite to the diaphragm assembly 4*a*1, for example, the vibration plate 4*b*1 is disposed in parallel to the diaphragm assembly 4*a*1. Herein, "parallel" means that the vibration plate 4*b*1 and the diaphragm assembly 4*a*1 are completely parallel to each other, that is, an included angle is 0° or may fall within a specific error range, for example, the included angle between the vibration plate 4*b*1 and the diaphragm assembly 4*a*1 is −10° ~10°. A material of the vibration plate 4*b*1** includes but is not limited to metal and plastic.

The first speaker unit **4*b* is fastened in the housing 1 by using the vibration plate 4*b*1. Specifically, the first speaker unit 4*b* is fastened in the first accommodating cavity 101 by using an outer peripheral edge of the vibration plate 4*b*1. Specifically, the vibration plate 4*b*1 includes a bearing portion 4*b*11 and a connecting portion 4*b*12**.

The bearing portion **4*b*11 is configured to bear the piezoelectric ceramic sheet 4*b*2 and directly faces the piezoelectric ceramic sheet 4*b*2. The connecting portion 4*b*12 is disposed around an outer circumference of the bearing portion 4*b*11, so that the vibration plate 4*b*1 is fastened on the inner wall surface of the housing 1 by using the connecting portion 4*b*12. In this way, when the vibration plate 4*b*1 is connected to the housing 1, the piezoelectric ceramic sheet 4*b*2 is suspended, and the bearing portion 4*b*11 of the vibration plate 4*b*1 is also in the suspended state, so that the piezoelectric ceramic sheet 4*b*2 can drive vibration of the vibration plate 4*b*1**.

For example, a first step 113 is formed on the inner wall surface of the housing 1, and the connecting portion **4*b*12 can be supported and fastened on the first step 113. A manner of connecting the vibration plate 4*b*1 and the inner wall surface of the housing 1** includes but is not limited to adhering, clamping, welding, or screw connection.

The vibration plate **4*b*1 is connected to the housing 1. Therefore, when vibrating under driving of the piezoelectric ceramic sheet 4*b*2, the vibration plate 4*b*1 inevitably transfers the vibration to the housing 1, which causes poor comfort of a user in wearing the earphone 100 and is also not conducive to a sound production effect of the first speaker unit 4*b*. To resolve this technical problem, a material of a part that is of the front housing 11 and that is fastened on the vibration plate 4*b*1** may be a flexible material, for example, the material of the part is rubber or silica gel. Certainly, it can be understood that the material of the part may not be a flexible material.

The piezoelectric ceramic sheet **4*b*2 is disposed through laminating on a surface on a side that is of the vibration plate 4*b*1 and that faces the sound output hole 110. In this way, the front cavity K1 can be defined by using a surface on a side that is of the vibration plate 4*b*1 and that faces the second speaker unit 4*a*, the diaphragm assembly 4*a*1, and the inner wall surface of the housing 1, to help improve regularity of a shape of the front cavity K1, thereby further improving a sound output effect of the second speaker unit 4*a*. Certainly, in another example, the piezoelectric ceramic sheet 4*b*2 may be disposed on the surface on the side that is of the vibration plate 4*b*1 and that faces the second speaker unit 4*a*. Alternatively, the piezoelectric ceramic sheet 4*b*2 is disposed on each of surfaces on two sides of the vibration plate 4*b*1 in a thickness direction. A manner of connecting the piezoelectric ceramic sheet 4*b*2 and the vibration plate 4*b*1** includes but is not limited to adhering.

The piezoelectric ceramic sheet **4*b*2 is annular. It can be understood that the annular piezoelectric ceramic sheet 4*b*2 and the annular vibration plate 4*b*1 that are disposed through laminating may jointly define the sound output channel 4*bb***.

The piezoelectric ceramic sheet **4*b*2 includes a piezoelectric body 4*b*23, a first electrode layer 4*b*21, and a second electrode layer 4*b*22. The piezoelectric body 4*b*23, the first electrode layer 4*b*21, and the second electrode layer 4*b*22 are sequentially disposed through laminating. In some examples, the first electrode layer 4*b*21, the piezoelectric body 4*b*23, and the second electrode layer 4*b*22 each may have one layer. In some other examples, the first electrode layer 4*b*21, the piezoelectric body 4*b*23, and the second electrode layer 4*b*22 each may have a plurality of layers, and the plurality of first electrode layers 4*b*21, the plurality of layers of piezoelectric bodies 4*b*23, and the plurality of second electrode layers 4*b*22 are arranged in a sequence of the first electrode layer 4*b*21, the piezoelectric body 4*b*23, and the second electrode layer 4*b*22, to ensure that a layer of piezoelectric body 4*b*23** is arranged between two adjacent electrode layers.

A material of the piezoelectric body **4*b*23** includes but is not limited to aluminum nitride and zinc oxide, and rare earth element doped materials (such as scandium doping at a specific atomic ratio) of the foregoing materials; or may be structure compounds such as lead zirconate, lead zirconium titanate, lead lanthanum zirconate titanate, doped lead zirconium titanate, barium titanate, lithium niobate, lithium tantalate, polyvinylidene difluoride (pvdf), and tungsten bronze, solid solutions such as barium titanate and bismuth ferrite, and the like.

The first electrode layer **4*b*21 may be formed on the piezoelectric body 4*b*23 by using a process such as evaporation, electroplating, or sputtering. A material of the first electrode layer 4*b*21 may be metal. Specifically, for example, the material of the first electrode layer 4*b*21** includes but is not limited to molybdenum, aluminum, tungsten, ruthenium, gold, platinum, silver, copper, palladium, chromium, iron, tin, nickel, and the like.

The second electrode layer **4*b*22 may be formed on the piezoelectric body 4*b*23 by using a process such as evaporation, electroplating, or sputtering. A material of the second electrode layer 4*b*22 may be metal. Specifically, for example, the material of the second electrode layer 4*b*22 includes but is not limited to molybdenum, aluminum, tungsten, ruthenium, gold, platinum, silver, copper, palladium, chromium, iron, tin, nickel, and the like. The material of the first electrode layer 4*b*21 may be the same as or different from the material of the second electrode layer 4*b*22**.

Still referring to FIG. 9, to facilitate electrical connection between the first speaker unit **4*b* and the main board 2, the first speaker unit 4*b* has an external terminal 4*b*3. The external terminal 4*b*3 is located on a side that is of the first speaker unit 4*b* and that faces the sound output hole 110. The external terminal 4*b*3 is enabled to be located on the side that is of the first speaker unit 4*b* and that faces the sound output hole 110, to help form the front cavity K1 of the second speaker unit 4*a*, and avoid a problem that the external terminal 4*b*3 cannot be connected to a signal wire because the external terminal 4*b*3 is located in the front cavity K1. Certainly, it can be understood that in another example, the external terminal 4*b*3 may face the second speaker unit 4*a***.

Specifically, referring to FIG. 9 and with reference to FIG. 8, the external terminal **4*b*3 includes a positive external terminal 4*b*31 and a negative external terminal 4*b*32. One of the positive external terminal 4*b*31 and the negative external terminal is disposed on the vibration plate 4*b*1, and the vibration plate 4*b*1 is conductive. The second electrode layer 4*b*22 is electrically connected to the vibration plate 4*b*1. The other of the positive external terminal 4*b*31 and the negative external terminal 4*b*32 is disposed in the first electrode layer 4*b*21 in a surface layer. This disposing can facilitate separate disposing of the positive external terminal 4*b*31 and the negative external terminal 4*b*32**, to avoid a short circuit.

For example, one of the positive external terminal **4*b*31 and the negative external terminal may be connected to the vibration plate 4*b*1 through welding or adhering by a conductive adhesive. The other of the positive external terminal 4*b*31 and the negative external terminal may be connected to the first electrode layer 4*b*21** through welding or adhering by a conductive adhesive.

Specifically, when alternating current is applied to the piezoelectric ceramic speaker unit, the piezoelectric body **4*b*23 is stretched and deformed, to drive the vibration plate 4*b*1 to vibrate to push air to vibrate to produce a sound. Because the piezoelectric ceramic sheet 4*b*2** is a thin film structure and has a relatively small bending modulus in a longitudinal direction, relatively large sound pressure can be output.

Figure 10:
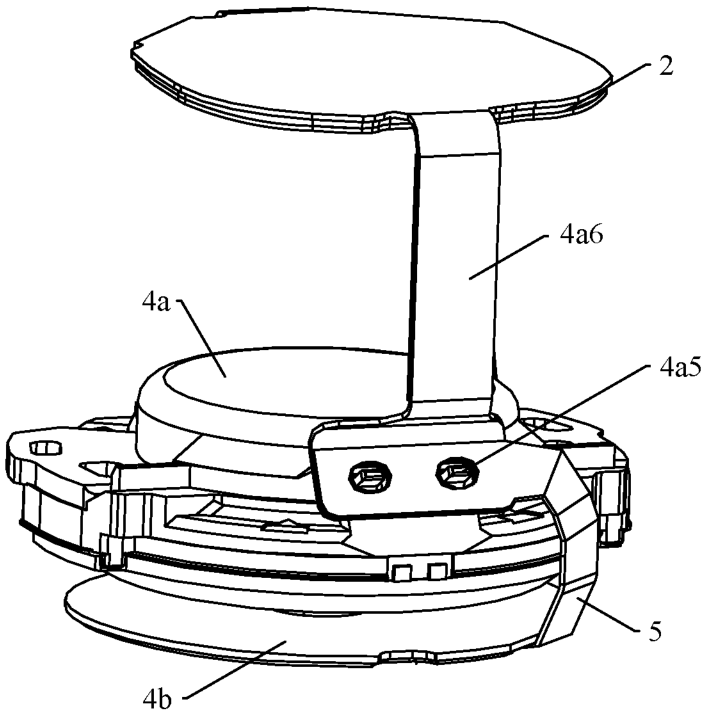
FIG. 10 is a schematic diagram of connection based on a main board, a first speaker unit, a second speaker unit, a first signal wire, and a conductive wire in the earphone shown in FIG. 4-FIG. 5.

Referring to FIG. 10, FIG. 10 is a schematic diagram of connection based on the main board 2, the first speaker unit **4*b*, the second speaker unit 4*a*, a first signal wire 5, and a conductive wire 4*a*6 in the earphone 100 shown in FIG. 4-FIG. 5. In this embodiment, to simplify an electrical connection relationship between the main board 2 and each of the first speaker unit 4*b* and the second speaker unit 4*a*, the external terminal 4*b*3 is electrically connected to the wiring terminal 4*a*5 through the first signal wire 5, and the wiring terminal 4*a*5 may be electrically connected to the main board 2 through the conductive wire 4*a*6**.

In this way, electrical connection between the second moving coil speaker unit 4 and the main board 2 can be implemented by using the conductive wire **4*a*6, and electrical connection between the first speaker unit 4*b* and the main board 2 can be implemented by using the conductive wire 4*a*6 and the first signal wire 5. Therefore, an electrical connection relationship between the functional component in the earphone 100 and the main board 2 can be simplified to at least a specific extent, to avoid a problem that the first signal wire 5 needs to be disposed excessively long because the main board 2 and the external terminal 4*b*3 are electrically connected by using the first signal wire 5**.

For example, the conductive wire **4*a*6 may be an enameled wire. Certainly, this application is not limited thereto. The conductive wire 4*a*6 may alternatively be a flexible printed circuit (flexible printed circuit, FPC). The first signal wire 5 may be an enameled wire. Certainly, this application is not limited thereto. The first signal wire 5** may alternatively be a flexible printed circuit.

Figure 11:
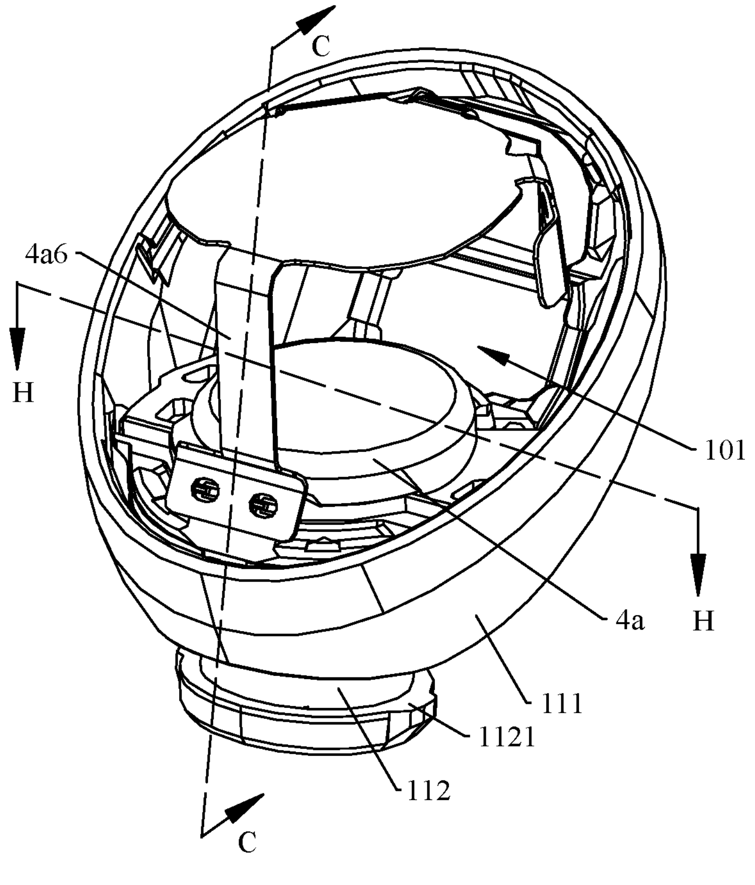
FIG. 11 is a schematic diagram of a partial structure of an earphone according to still some other embodiments of this application.
Figure 12:
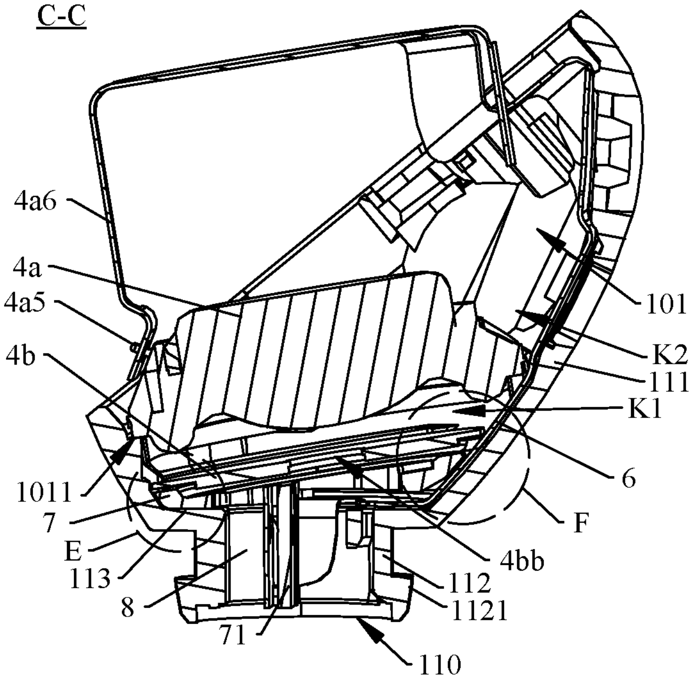
FIG. 12 is a schematic diagram of a cross section along a line C-C based on the partial structure of the earphone shown in FIG. 11.

Referring to FIG. 11 and FIG. 12, FIG. 11 is a schematic diagram of a partial structure of an earphone 100 according to still some other embodiments of this application, and FIG. 12 is a schematic diagram of a cross section along a line C-C based on the partial structure of the earphone 100 shown in FIG. 11. This embodiment differs from the foregoing embodiment in that the earphone 100 further includes a bracket 7. The bracket 7 is located between the first speaker unit **4*b* and the sound output hole 110, and the first speaker unit 4*b* is fastened on the inner wall surface of the housing 1 by using the bracket 7. In this way, disposing of the bracket 7 can facilitate mounting of the first speaker unit 4*b*. In addition, the bracket 7 is disposed between the first speaker unit 4*b* and the sound output hole 110, which can avoid a problem that a relatively large front cavity K1 needs to be disposed due to disposing of the bracket 7, and can further help form a regular front cavity K1 to help improve a sound production effect of the second speaker unit 4*a***.

Still referring to FIG. 11 and FIG. 12, the earphone 100 further includes a noise-canceling microphone 8. The noise-canceling microphone 8 is located between the first speaker unit **4*b* and the sound output hole 110, and the noise-canceling microphone 8 is electrically connected to the main board 2. This disposing helps dispose the noise-canceling microphone 8 close to the sound output hole 110, so that the noise-canceling microphone 8 picks up a background sound in an ear canal of a human ear and feeds back the background sound to the main board 2, to help improve a noise-canceling effect of the earphone 100. Specifically, the noise-canceling microphone 8 and the main board 2 may be electrically connected through a second signal wire 6**.

The second signal wire 6 may be an enameled wire. Certainly, this application is not limited thereto. The second signal wire 6 may alternatively be a flexible printed circuit.

To improve a sound pickup effect of the noise-canceling microphone 8, the noise-canceling microphone 8 may extend into the sound outlet 112. This disposing helps the noise-canceling microphone 8 to be closer to the sound output hole 110, to improve a sound pickup effect of the microphone, thereby further improving a noise-canceling effect of the earphone 100.

To facilitate mounting of the noise-canceling microphone 8, still referring to FIG. 12, the noise-canceling microphone 8 can be fastened in the housing 1 by using the bracket 7. In this way, the noise-canceling microphone 8 and the first speaker unit **4*b* are fastened together by using the bracket 7, to form a modularized design. Therefore, when the first speaker unit 4*b*, the bracket 7, and the noise-canceling microphone 8 are mounted, the first speaker unit 4***b*, the bracket 7, and the noise-canceling microphone 8 can be easily mounted in the housing 1 as a whole, so that the first speaker unit 4*b* and the noise-canceling microphone 8 do not need to be separately mounted, which can simplify mounting steps and improve assembly efficiency. In addition, overall structural compactness of the first speaker unit 4*b* and the noise-canceling microphone 8 is relatively high.

Certainly, it can be understood that in another example, the noise-canceling microphone 8 and the first speaker unit 4*b* may alternatively be separately independently mounted in the housing 1. In other words, the noise-canceling microphone 8 may be fastened in the housing 1 without using the bracket 7.

Figure 13:
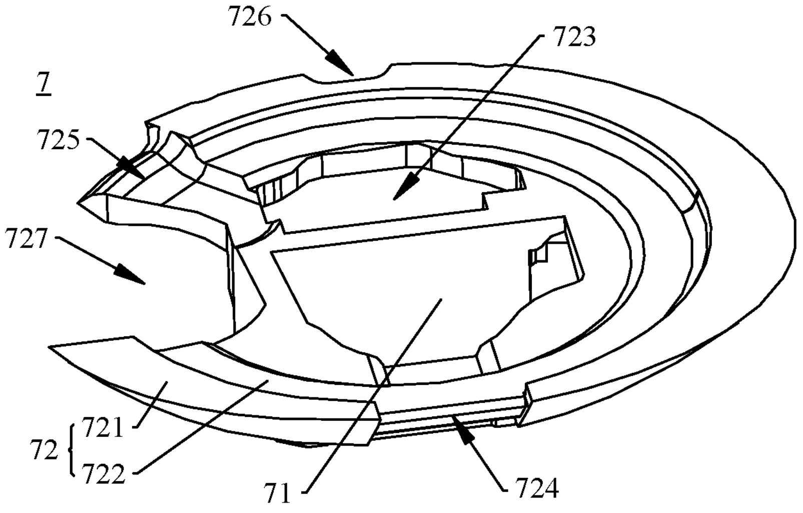
FIG. 13 is a three-dimensional diagram based on a bracket in the earphone shown in FIG. 11-FIG. 12.
Figure 14:
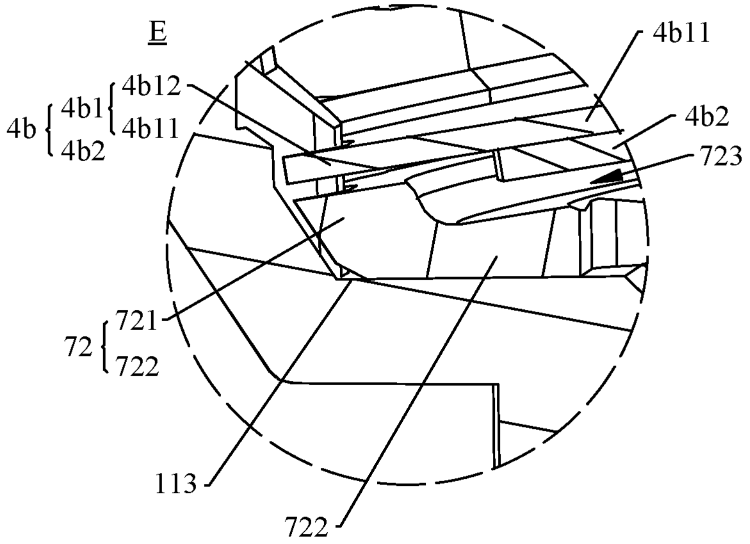
FIG. 14 is an enlarged view of a part that is based on the partial structure of the earphone shown in FIG. 12 and that is circled at E.

Referring to FIG. 13 and FIG. 14, FIG. 13 is a three-dimensional diagram based on a bracket 7 in the earphone 100 shown in FIG. 11-FIG. 12, and FIG. 14 is an enlarged view of a part that is based on the partial structure of the earphone 100 shown in FIG. 12 and that is circled at E. The bracket 7 includes a fixing portion 72 and a support plate 71.

The fixing portion 72 has an annular shape extending along a circumferential direction of the housing 1. The first step 113 is formed on the inner peripheral surface of the housing 1, and the fixing portion 72 is supported and fastened on the first step 113. For example, a manner of connecting the fixing portion 72 and the first step 113 includes but is not limited to adhering, clamping, welding, or screw connection. The first speaker unit 4*b* is supported and fastened on the fixing portion 72 by using the connecting portion 4*b*12 of the vibration plate 4*b*1. A manner of connecting the vibration plate 4*b*1 and the fixing portion 72 includes but is not limited to adhering, clamping, welding, or screw connection. Disposing of the first step 113 can facilitate overall positioning and mounting of the bracket 7 and the first speaker unit 4*b*.

Specifically, the sound output channel 4*bb* is formed on the first speaker unit 4*b*, the annular fixing portion 72 can define a sound transmission channel 723, and the sound transmission channel 723 can communicate the sound output hole 110 and the sound output channel 4*bb*. Therefore, in one aspect, the sound transmission channel 723 may serve as a front sound cavity of the first speaker unit 4*b*, and the first speaker unit 4*b* vibrates to drive air in the front sound cavity to vibrate to produce a sound. In another aspect, the sound transmission channel 723 may also serve as a sound transmission channel between the second speaker unit 4*a* and the sound output hole 110, to facilitate sound production of the second speaker unit 4*a*.

The vibration plate 4*b*1 is connected to the housing 1 through the fixing portion 72. Therefore, when vibrating under driving of the piezoelectric ceramic sheet 4*b*2, the vibration plate 4*b*1 inevitably transfers the vibration to the housing 1, which causes poor comfort of a user in wearing the earphone 100 and is also not conducive to a sound production effect of the first speaker unit 4*b*. To resolve this technical problem, a material of the fixing portion 72 may be a flexible material, for example, the material of the fixing portion 72 is rubber or silica gel.

In this way, vibration transferred from the first speaker unit 4*b* to the housing 1 can be attenuated by using a cushioning effect of the fixing portion 72, thereby improving the comfort of a user in wearing the earphone 100 and improving a sound production effect of the first speaker unit 4*b*. In addition, vibration of the housing 1 can be prevented, to a specific extent, from interfering with air vibration in the front cavity K1, thereby helping improve a sound production effect of the second speaker unit 4*a*.

Based on this, to simplify processing of the entire bracket 7 and ensure material consistency of the bracket 7, a material of the entire bracket 7 may be a flexible material. For example, the material of the bracket 7 is rubber or silica gel. In another example, in the bracket 7, only the fixing portion 72 may be of a flexible material, and all other structures on the bracket 7, such as the support plate 71, may be of non-flexible materials. Certainly, it can be understood that the bracket 7 may alternatively be of a non-flexible material. For example, the material of the bracket 7 includes but is not limited to hard plastic, metal, and the like. In this way, a service life of the bracket 7 can be prolonged. For example, the material of the bracket 7 may be the same as the material of the housing 1.

Still referring to FIG. 13 and FIG. 14, the fixing portion 72 includes a fixing plate 722 and an annular flange 721. The fixing plate 722 is annular in shape, and the fixing plate 722 is supported and fastened on a step surface that is of the first step 113 and that faces the second speaker unit 4*a*. The annular flange 721 is disposed around an edge of the fixing plate 722 and protrudes toward a direction of the second speaker unit 4*a*. The outer peripheral edge of the first speaker unit 4*b* (that is, the connecting portion 4*b*12 of the vibration plate 4*b*1) is supported and fastened on an end surface on a side that is of the annular flange 721 and that faces the sound output hole 110.

In this embodiment of this application, the outer peripheral edge of the first speaker unit 4*b* (that is, the connecting portion 4*b*12 of the vibration plate 4*b*1) is supported and fastened on the end surface on the side that is of the annular flange 721 and that faces the sound output hole 110. In one aspect, the first speaker unit 4*b* and the fixing plate 722 can be spaced apart by using the annular flange 721, to suspend the piezoelectric ceramic sheet and the bearing portion 4*b*11, thereby helping improve a sound output effect of the first speaker unit 4*b*. In another aspect, this further helps design a larger size of the first speaker unit 4*b*, thereby further improving a sound output effect. In addition, when the annular flange 721 is fastened on a step surface that is of the first step 113 and that faces a central axis of the second speaker unit 4*a*, it is further helpful to enlarge a connection area between the bracket 7 and the housing 1, to improve reliability of connection between the bracket 7 and the housing 1.

It can be understood that the annular flange 721 and the annular fixing plate 722 jointly define the sound transmission channel 723.

Certainly, in another example, a structural form of the fixing portion 72 is not limited thereto. The fixing portion 72 may not be provided with a flange, so that the outer peripheral edge of the first speaker unit 4*b* (that is, the connecting portion 4*b*12 of the vibration plate 4*b*1) can be supported and fastened on the fixing plate 722.

Still referring to FIG. 13 and with reference to FIG. 12, the support plate 71 is fastened on the fixing portion 72, and the support plate 71 extends toward the direction of the sound output hole 110. Therefore, it is helpful to mount the noise-canceling microphone 8 close to the sound output hole 110, thereby improving a sound pickup effect of the noise-canceling microphone 8.

Further, to help the noise-canceling microphone 8 to be located in the sound outlet 112, the support plate 71 extends into the sound outlet 112. In this way, the noise-canceling microphone 8 can be located in the sound outlet 112 while the noise-canceling microphone 8 and the first speaker unit 4*b* are modularized.

Specifically, still referring to FIG. 13, to help the support plate 71 extend into the sound outlet 112 without interfering with the housing 1, the support plate 71 may be located at an inner circumference of the fixing portion 72 and is connected to an inner peripheral wall of the fixing portion 72, for example, connected to an inner peripheral wall of the fixing plate 722. Therefore, compared with that the support plate 71 is connected to an outer peripheral edge of the fixing portion 72, when the support plate 71 is connected to the inner peripheral wall of the fixing portion 72, interference can be prevented from being generated between the support plate 71 and the inner wall of the housing 1, thereby avoiding a problem that mounting space of the noise-canceling microphone 8 is insufficient due to interference generated between the noise-canceling microphone 8 and the inner wall of the housing 1, and helping ensure reliable mounting of the noise-canceling microphone 8. It can be understood that the inner peripheral wall of the fixing portion 72 is an inner peripheral wall of the sound transmission channel 723.

Figure 15:
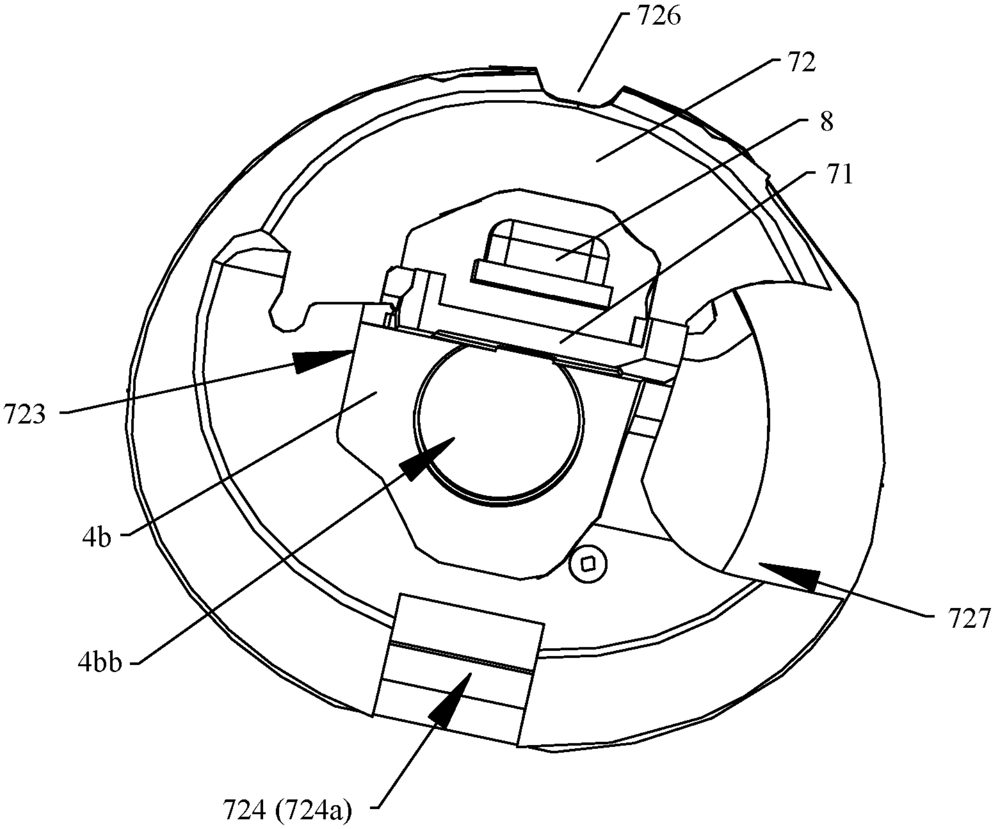
FIG. 15 is a schematic diagram of cooperation based on a bracket, a first speaker unit, and a noise-canceling microphone in the earphone shown in FIG. 11-FIG. 12.

To improve a sound transmission effect of the sound transmission channel 723 and prevent the support plate 71 and the noise-canceling microphone 8 from interfering with sound transmission of the sound output channel **4*bb*, referring to FIG. 15, FIG. 15 is a schematic diagram of cooperation based on the bracket 7, the first speaker unit 4*b*, and the noise-canceling microphone 8 in the earphone 100 shown FIG. 11-FIG. 12. Orthographic projections of the support plate 71 and the noise-canceling microphone 8 on the first speaker unit 4*b* are at an outer circumference of the sound output channel 4*bb*. Therefore, the support plate 71 and the noise-canceling microphone 8 can be prevented from shielding sound output of the second speaker unit 4*a*, thereby ensuring a sound output effect of the second speaker unit 4*a*. Certainly, it can be understood that in another example, the orthographic projections of the support plate 71 and the noise-canceling microphone 8 on the first speaker unit 4*b* may alternatively cover a part of the sound output channel 4*bb***.

Based on this, still referring to FIG. 15, the orthographic projection of the support plate 71 on the first speaker unit **4*b* may be located between the orthographic projection of the noise-canceling microphone 8 on the first speaker unit 4*b* and the sound output channel 4*bb*. This disposing helps further dispose the support plate 71 close to a middle region of the sound outlet 112, to prevent interference from being generated between the support plate 71 and the sound outlet 112. Certainly, the orthographic projection of the support plate 71 on the first speaker unit 4*b* may alternatively be located on a side that is of the orthographic projection of the noise-canceling microphone 8 on the first speaker unit 4*b* and that is away from the sound output channel 4*bb***.

Figure 16:
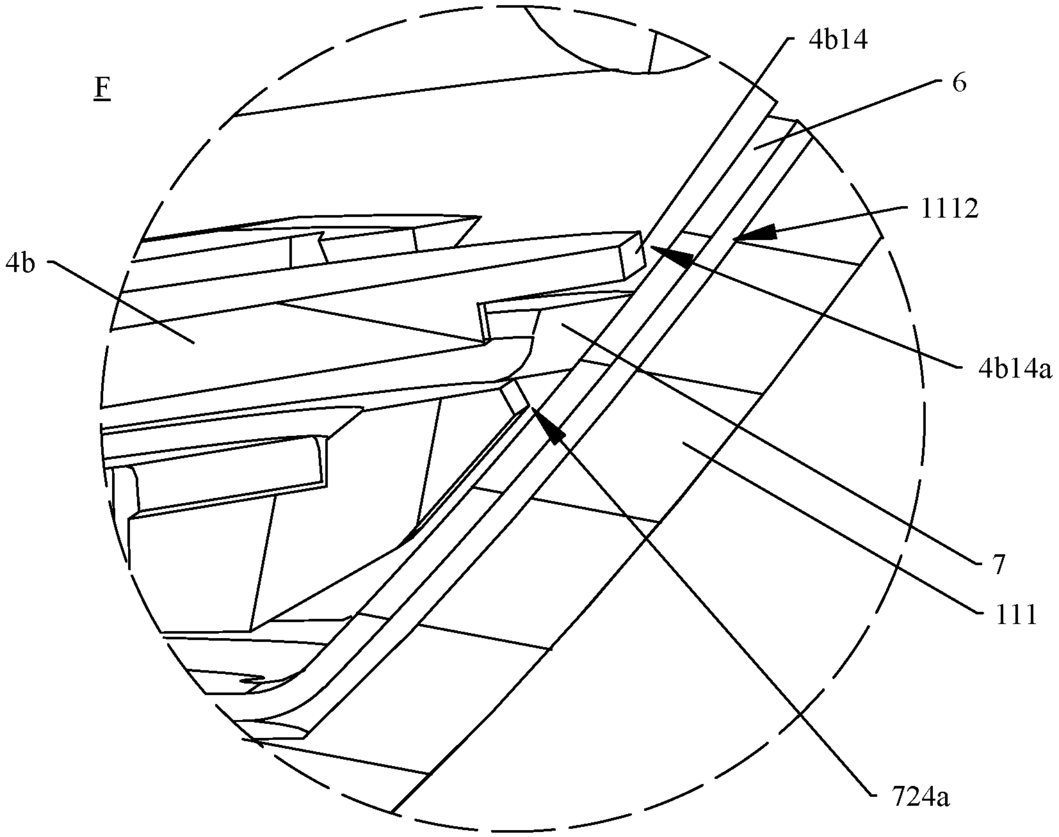
FIG. 16 is an enlarged view of a part that is based on the partial structure of the earphone shown in FIG. 12 and that is circled at F.

Because the main board 2 is located on a side that is of the second speaker unit **4*a* and that is away from the sound output hole 110, and the noise-canceling microphone 8 is located between the fixing portion 72 and the sound output hole 110, still referring to FIG. 15 and FIG. 16, FIG. 16 is an enlarged view of a part that is based on the partial structure of the earphone 100 shown in FIG. 12 and that is circled at F. To facilitate disposing of the second signal wire 6 connected between the noise-canceling microphone 8 and the main board 2, giving-way space 724*a* is formed between the fixing portion 72 and the inner wall surface of the housing 1, and the second signal wire 6 extends toward a direction of the main board 2 through the giving-way space 724*a*. Specifically, the giving-way space 724*a* is formed between the fixing portion 72 and the first step 113**.

For example, a part that is of the fixing portion 72 and that faces a surface of the first step 113 is recessed toward a direction away from the first step 113 to form a giving-way slot 724. The giving-way slot 724 and the first step 113 define the giving-way space **724*a*. One part of the giving-way slot 724 is located on the fixing plate 722, and the other part is located on the annular flange 721. For another example, a part of the step surface of the first step 113 is recessed toward a direction away from the fixing portion 72 to form the giving-way slot 724. The giving-way slot 724 cooperates with a surface that is of the fixing portion 72 and that faces the first step 113, to define the giving-way space 724*a***.

Figure 17:
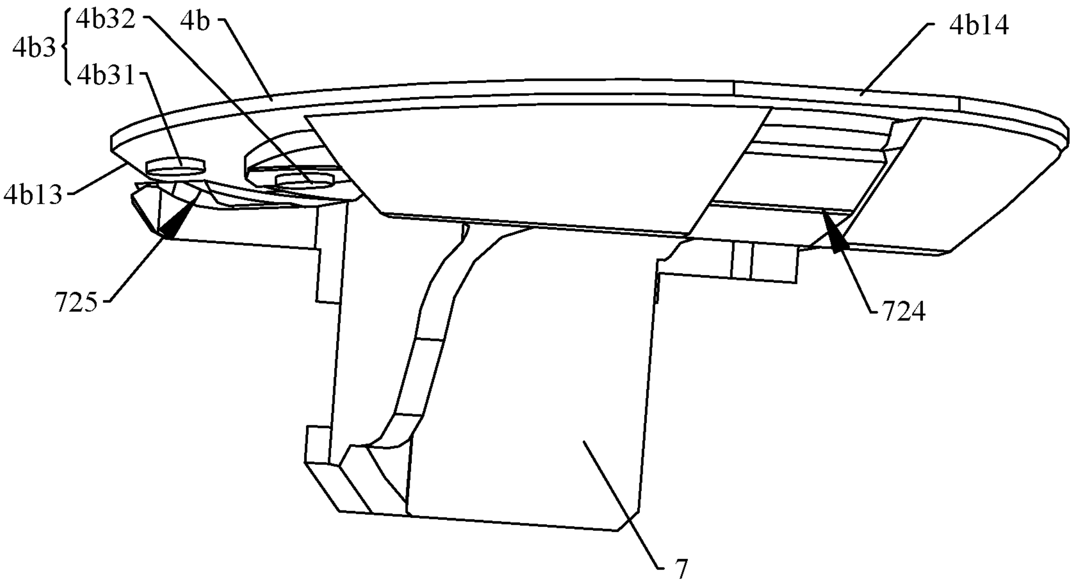
FIG. 17 is a schematic diagram of cooperation based on a bracket and a first speaker unit shown in FIG. 11-FIG. 12.

Based on this, to further avoid the second signal wire 6, still referring to FIG. 16 and with reference to FIG. 17, FIG. 17 is a schematic diagram of cooperation based on the bracket 7 and the first speaker unit **4*b* shown in FIG. 11-FIG. 12. An outer peripheral surface of the first speaker unit 4*b* has a second contour surface 4*b*14. Specifically, an outer peripheral surface of the vibration plate 4*b*1 has the second contour surface 4*b*14. The inner peripheral surface of the housing 1 has a second region 1112 directly facing the second contour surface 4*b*14. The second contour surface 4*b*14 and the second region 1112 are spaced apart to form a second avoidance gap 4*b*14*a*, and the second avoidance gap 4*b*14*a* communicates with the giving-way space 724*a*. In this way, the second signal wire 6 can extend toward the direction of the main board 2 by sequentially passing through the giving-way space 724*a* and the second avoidance gap 4*b*14*a*. This helps improve wiring reliability of the second signal wire 6 and avoid interference between the second signal wire 6 and other structures in the housing 1**.

For example, to space apart the second contour surface **4*b*14 and the second region 1112, for example, the second contour surface 4*b*14 is a planar surface. For another example, the second contour surface 4*b*14 is an arc-shaped surface extending along the circumferential direction of the housing 1, and the second contour surface 4*b*14 arches toward a direction of a center of the first speaker unit 4*b***.

For example, to space apart the second contour surface **4*b*14 and the second region 1112, the second region 1112 may be recessed toward a direction away from the second contour surface 4*b*14** to form a recessed slot.

Figure 18:
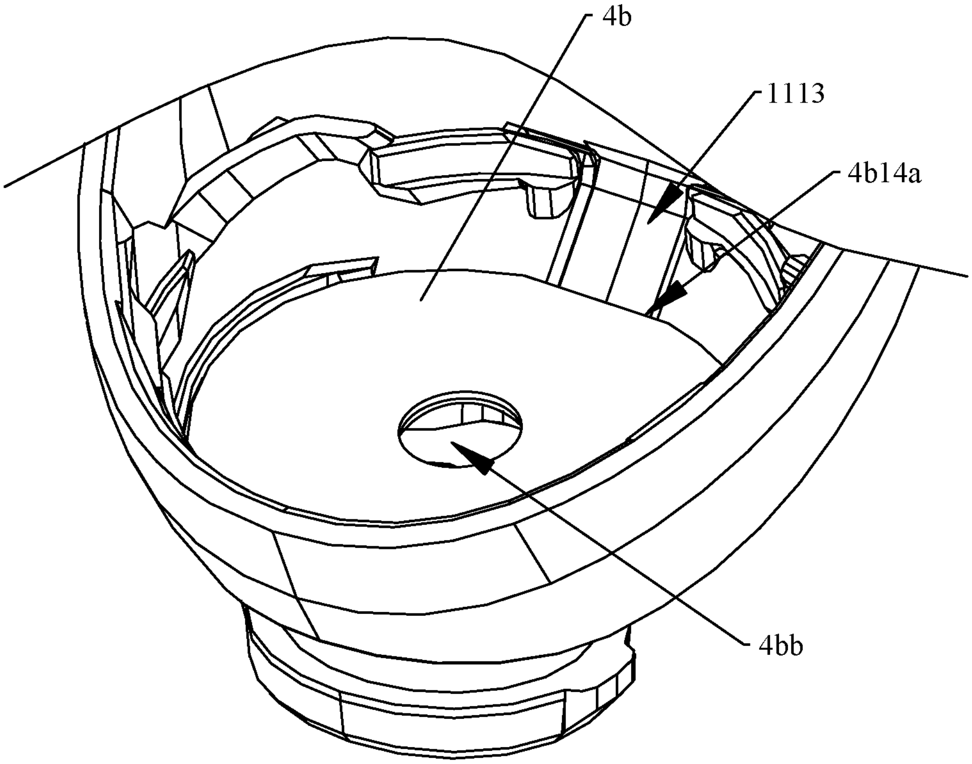
FIG. 18 is a schematic diagram of cooperation based on a part of a front housing, a bracket, and a first speaker unit in the earphone shown in FIG. 11-FIG. 12.

Referring to FIG. 18, FIG. 18 is a schematic diagram of cooperation based on a part of the front housing 11, the bracket 7, and the first speaker unit **4*b* in the earphone 100 shown in FIG. 11-FIG. 12. A part that is of the inner peripheral surface of the housing 1, that is, an inner peripheral surface of the front housing 11, and that is located between the main board 2 and the fixing portion 72 has a wiring groove 1113. The wiring groove 1113 may communicate with the second avoidance gap 4*b*14*a*, and a part of the second signal wire 6 may be fastened in the wiring groove 1113. In this way, the second signal wire 6 can extend toward the direction of the main board 2 by sequentially passing through the giving-way space 724*a*, the second avoidance gap 4*b*14*a*, and the wiring groove 1113. This helps improve wiring reliability of the second signal wire 6 and avoid interference between the second signal wire 6 and other structures in the housing 1**.

For example, the second signal wire 6 may be fastened in the wiring groove 1113 through adhering, clamping, or the like.

For example, the wiring groove 1113, the recessed slot, and the giving-way slot 724 formed on the housing 1 described above may communicate with each other. This disposing is simple in structure and is convenient for processing and manufacturing.

The external terminal **4*b*3 of the first speaker unit 4*b* faces the sound output hole 110, and the bracket 7 is located between the first speaker unit 4*b* and the sound output hole 110. Therefore, to avoid that the first signal wire 5 cannot be welded due to interference generated between the bracket 7 and the external terminal 4*b*3, still referring to FIG. 17 and with reference to FIG. 13, a part of a surface that is of the fixing portion 72 and that faces the first speaker unit 4*b* is recessed toward the direction of the sound output hole 110 to form an avoidance slot 725, and the avoidance slot 725 is configured to avoid the external terminal 4*b*3. It can be understood that when the first signal wire 5 is connected to the external terminal 4*b*3, the avoidance slot 725 may also have a function of avoiding the first signal wire 5**.

Specifically, to further improve an avoidance effect of the avoidance slot 725 on the first signal wire 5, the avoidance slot 725 may extend to the outer peripheral edge of the fixing portion 72. In this way, the first signal wire 5 can extend from the sound transmission channel 723 through the avoidance slot 725 and extend toward the direction of the second speaker unit **4*a*, to be connected to the wiring terminal 4*a*5 of the second speaker unit 4*a***.

Figure 19:
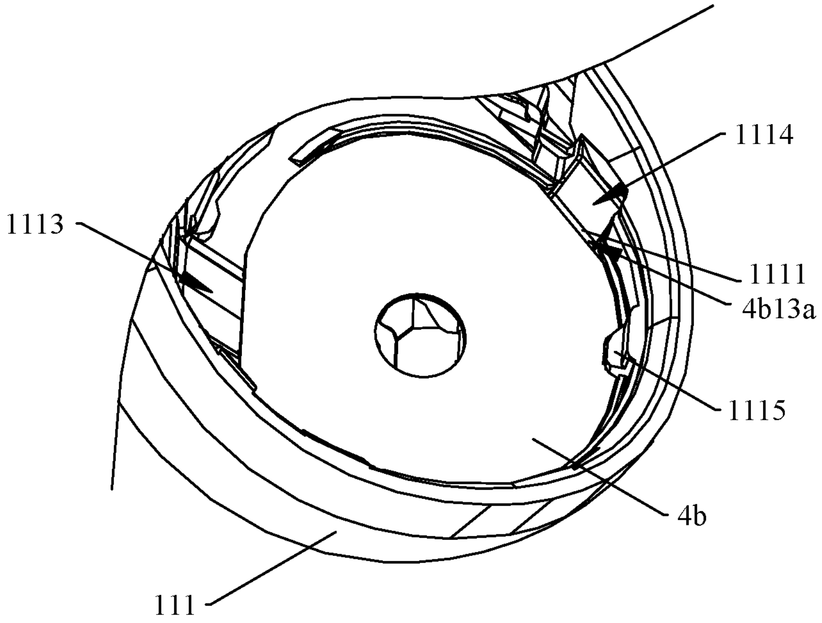
FIG. 19 is a schematic diagram that is in another direction and that is obtained after cooperation based on a part of a front housing, a bracket, and a first speaker unit in the earphone shown in FIG. 18.
Figure 20:
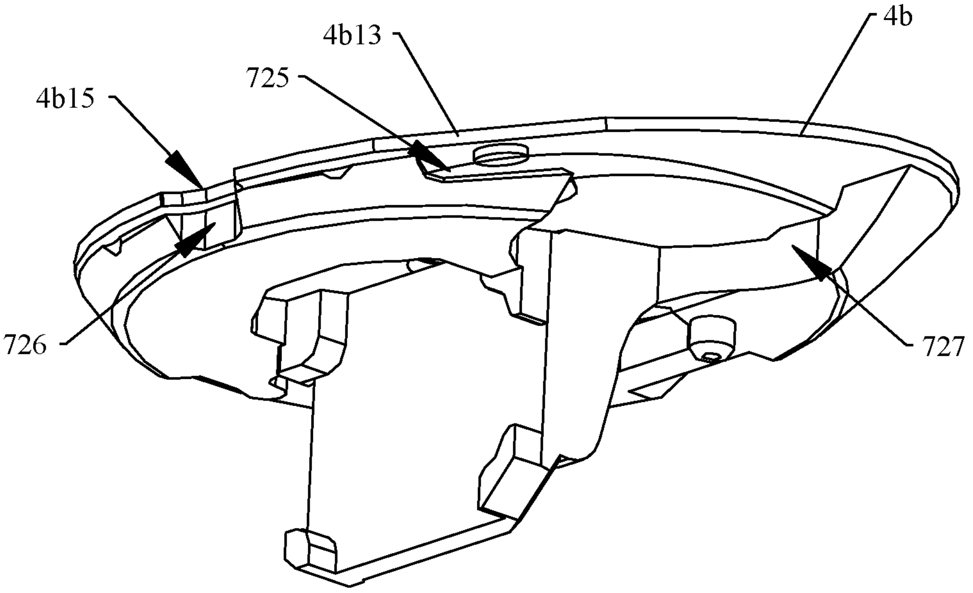
FIG. 20 is a schematic diagram that is in another direction and that is obtained after cooperation based on the bracket and a first speaker unit shown in FIG. 17.

Based on this, to further avoid the first signal wire 5, referring to FIG. 19-FIG. 20, FIG. 19 is a schematic diagram that is in another direction and that is obtained after cooperation based on a part of the front housing 11, the bracket 7, and the first speaker unit **4*b* in the earphone 100 shown in FIG. 18, and FIG. 20 is a schematic diagram that is in another direction and that is obtained after cooperation based on the bracket 7 and the first speaker unit 4*b* shown in FIG. 17. The outer peripheral surface of the first speaker unit 4*b* has a first contour surface 4*b*13. Specifically, the outer peripheral surface of the vibration plate 4*b*1 has the first contour surface 4*b*13. The inner peripheral surface of the housing 1 has a first region 1111 directly facing the first contour surface 4*b*13. The first contour surface 4*b*13 and the first region 1111 are spaced apart to form a first avoidance gap 4*b*13*a*. The first avoidance gap 4*b*13*a* communicates with the avoidance slot 725**.

In this way, the first signal wire 5 can extend toward the direction of the second speaker unit **4*a* by sequentially passing through the avoidance slot 725 and the first avoidance gap 4*b*13*a* to be connected to the wiring terminal 4*a*5 of the second speaker unit 4*a*. This helps improve wiring reliability of the first signal wire 6 and avoid interference between the first signal wire 6 and other structures in the housing 1**.

To space apart the first contour surface **4*b*13 and the first region 1111, for example, the first contour surface 4*b*13 is a planar surface. For another example, the first contour surface 4*b*13 is an arc-shaped surface extending along the circumferential direction of the housing 1, and the first contour surface 4*b*13 arches toward the direction of the center of the first speaker unit 4*b***.

For example, to space apart the first contour surface **4*b*13 and the first region 1111, the first region 1111 is a curved surface such as an arc-shaped surface extending along the circumferential direction of the housing 1, or the first region 1111 may be recessed toward a direction away from the first contour surface 4*b*13** to form a recessed slot.

Based on this, still referring to FIG. 19 and FIG. 20, a part that is of the inner peripheral surface of the housing 1 and that is located between the second speaker unit **4*a* and the first speaker unit 4*b* has a wiring slot 1114. The wiring slot 1114 can communicate with the first avoidance gap 4*b*13*a*, and a part of the first signal wire 5 can be fastened in the wiring slot 1114, to avoid the first signal wire 5 by using the wiring slot 1114**.

In this way, the first signal wire 5 can sequentially pass through the avoidance slot 725, the first avoidance gap **4*b*13*a*, and the wiring slot 1114, to be connected to the wiring terminal 4*a*5 of the second speaker unit 4*a*. This helps improve reliability of the first signal wire 5 and avoid interference between the first signal wire 5 and other structures in the housing 1**.

For example, the first signal wire 5 may be fastened in the wiring slot 1114 through adhering, clamping, or the like.

To reduce a length of the first signal wire 5, the wiring terminal **4*a*5 directly faces the wiring slot 1114 along an arrangement direction of the first speaker unit 4*b* and the second speaker unit 4*a***.

Still referring to FIG. 19 and FIG. 20, to facilitate overall mounting and positioning of the bracket 7 and the first speaker unit **4*b* to prevent the bracket 7 from being placed inversely or misplaced, a first positioning portion 726 is formed on an outer peripheral wall of the fixing portion 72 (for example, an outer peripheral wall of the annular flange 721), and a second positioning portion 1115 is formed on the inner wall surface of the housing 1. The first positioning portion 726 cooperates with the second positioning portion 1115**.

For example, still referring to FIG. 19 and FIG. 20, the first positioning portion 726 may be a positioning slot, and the second positioning portion 1115 may be a bump protruding from the inner wall surface of the housing 1. For another example, the first positioning portion 726 may be a bump protruding from the outer peripheral wall of the fixing portion 72, and the second positioning portion 1115 may be a positioning slot formed on the inner wall surface of the housing 1.

To further improve convenience of overall mounting and positioning of the bracket 7 and the first speaker unit **4*b*, a third positioning portion 4*b*15 is disposed at a location that is at the outer peripheral edge of the first speaker unit 4*b* (for example, the vibration plate 4*b*1) and that corresponds to the first positioning portion 726, and the third positioning portion 4*b*15 and the first positioning portion 726 simultaneously cooperate with the second positioning portion 1115**.

For example, both the first positioning portion 726 and the third positioning portion **4*b*15 may be positioning slots, and the second positioning portion 1115 may be a bump protruding from the inner wall surface of the housing 1. For another example, both the first positioning portion 726 and the third positioning portion 4*b*15 may be bumps, and the second positioning portion 1115 is a positioning slot formed on the inner wall surface of the housing 1**.

It can be understood that in another example, on the basis of fastening the first speaker unit **4*b* in the housing 1 by using the bracket 7, the fixing portion 72 may not be provided with the first positioning portion 726, and instead, the third positioning portion 4*b*15 may cooperate with the second positioning portion 1115 to implement positioning. Alternatively, when the first speaker unit 4*b* is fastened in the housing 1 without using the bracket 7, but the first speaker unit 4*b* is directly fastened in the housing 1, the first speaker unit 4*b* implements positioning and mounting of the first speaker unit 4*b* through cooperation of the third positioning portion 4*b*15 and the second positioning portion 1115**.

Figure 21:
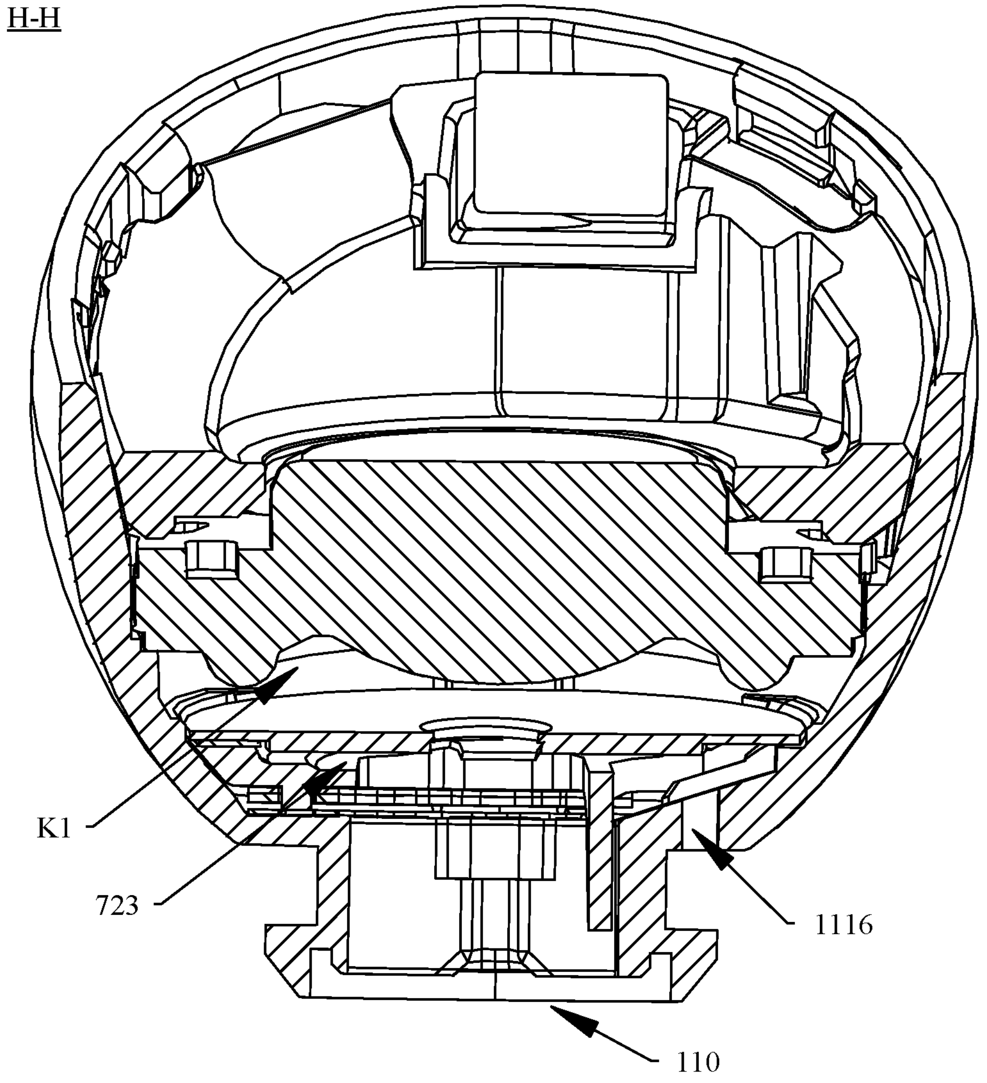
FIG. 21 is a schematic diagram of a cross section along a line H-H based on the partial structure of the earphone shown in FIG. 11, where a first signal wire, a conductive wire, and a main board are not shown.

Referring to FIG. 21, FIG. 21 is a schematic diagram of a cross section along a line H-H based on the partial structure of the earphone 100 shown in FIG. 11. The first signal wire 5, the conductive wire **4*a*6, and the main board 2 are not shown. The housing 1 has a balancing hole 1116, and the balancing hole 1116 communicates the front cavity K1 and an outer side of the housing 1. Specifically, when a user wears the earphone 100, the sound output hole 110 faces an ear canal of the user, and the housing 1 has a specific function of closing the ear canal of the user. The balancing hole 1116 is disposed, and the balancing hole 1116 is located outside the ear canal, so that the balancing hole 1116 can be used to balance air pressure in the front cavity K1 and air pressure on the outer side of the housing 1, thereby improving the comfort in using the earphone 100**.

Specifically, still referring to FIG. 21 and with reference to FIG. 13 and FIG. 20, the balancing hole is located at the first step 113, and an avoidance notch 727 is formed at a location that is of the fixing portion 72 and that corresponds to the balancing hole 1116. The avoidance notch 727 communicates the balancing hole 1116 and the sound transmission channel 723, to implement communication between the air pressure in the front cavity K1 and the air pressure on the outer side of the housing 1. It can be understood that when the balancing hole 1116 is at the location of the front cavity K1, the fixing portion 72 may not be provided with the avoidance notch 727.

The foregoing embodiments are further described below with reference to a change relationship between a frequency and a sound pressure level of the earphone 100 in the embodiments of this application.

Figure 22:
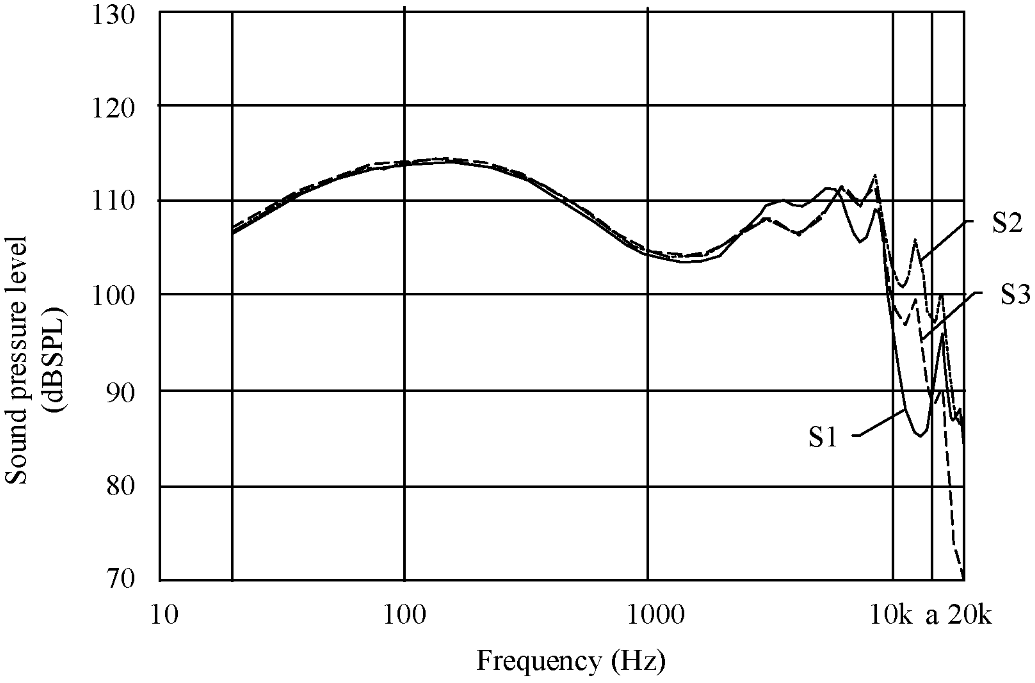
FIG. 22 is a change curve graph for a frequency and a sound pressure level of an earphone according to an embodiment of this application.

Referring to FIG. 22, FIG. 22 is a change curve graph for a frequency and a sound pressure level of the earphone 100 according to an embodiment of this application, where a horizontal coordinate represents the frequency in units of Hz, and a vertical coordinate represents the sound pressure level in units of dBSPL. In FIG. 22, a curve S1 represents a change relationship that is between a frequency and a sound pressure level and that corresponds to the earphone 100 shown in FIG. 1-FIG. 3 in this application. The earphone 100 has only the moving coil speaker unit 4. A curve S2 represents a change relationship that is between a frequency and a sound pressure level and that corresponds to the earphone 100 with dual speaker units (that is, the first speaker unit **4*b* and the second speaker unit 4*a*) in this application when the dual speaker units work simultaneously. A curve S3 represents a change relationship that is between a frequency and a sound pressure level and that corresponds to the earphone 100 with dual speaker units (that is, the first speaker unit 4*b* and the second speaker unit 4*a*) in this application when the second speaker unit 4*a* works and the first speaker unit 4*b*** does not work.

With reference to the curve S1 and the curve S3, it can be learned that in a high frequency band of 10000 Hz~a, where a value of a is 16000 Hz~18000 Hz, the sound pressure level of the curve S3 is higher than the sound pressure level of the curve S1 in a case of a same frequency, and the frequency of the curve S3 is higher than the frequency of the curve S1 in a case of a same sound pressure level. Therefore, through combination of the two parameters, that is, the sound pressure level and the frequency, it can be learned that a high-frequency effect that is of the earphone 100 with dual speaker units (that is, the first speaker unit **4*b* and the second speaker unit 4*a*) in this application and that is obtained when the cavity enclosed by the first speaker unit 4*b*, the second speaker unit 4*a*, and the inner wall of the housing 1 is used as the front cavity K1 of the second speaker unit 4*a* is superior to a high-frequency effect obtained when the moving coil speaker unit 4 in the earphone 100 shown in FIG. 1-FIG. 3** works alone.

In a frequency band of a~20000 Hz, the sound pressure level of the curve S3 is smaller than the sound pressure level of the curve S1 in a case of a same frequency, and the frequency of the curve S3 is smaller than the frequency of the curve S1 in a case of a same sound pressure level, to be specific, the curve S1 and the curve S3 reflect that in the frequency band of a~20000 Hz, a high-frequency effect that is of the earphone 100 with dual speaker units (that is, the first speaker unit **4*b* and the second speaker unit 4*a*) and that is obtained when the second speaker unit 4*a* produces a sound is inferior to a high-frequency effect obtained when the moving coil speaker unit 4 in the earphone 100 shown in FIG. 1-FIG. 3 works alone. However, in one aspect, compared with the frequency band of 10000 Hz~a, a sound in the frequency band of a~20000 Hz is less easily perceived by a human ear, and a frequency closer to 20000 Hz is less easily perceived by the human ear. In another aspect, this part of difference can be compensated for through addition of the first speaker unit 4*a*. Specifically, with reference to the curve S1 and the curve S2, it can be learned that in a relatively high frequency band of 10000 Hz~20000 Hz, a sound pressure level that is of the earphone 100 with dual speaker units and that is obtained when the dual speaker units simultaneously work is higher than a sound pressure level obtained when the moving coil speaker unit 4 in the earphone 100 shown in FIG. 1-FIG. 3 works alone. In a case of a same sound pressure level, a frequency that is of the earphone 100 with dual speaker units and that is obtained when the dual speaker units simultaneously work is higher than a frequency obtained when the moving coil speaker unit 4 in the earphone 100 shown in FIG. 1-FIG. 3 works alone. Therefore, the earphone 100 with dual speaker units (that is, the first speaker unit 4*b* and the second speaker unit 4*a***) in this application has a better overall high-frequency effect.

In the description of this specification, specific features, structures, materials, or characteristics may be combined in an appropriate manner in any one or more embodiments or examples.

Finally, it should be noted that the foregoing embodiments are merely intended to describe the technical solutions of this application, but not intended to limit the technical solutions of this application. Although this application is described in detail with reference to the foregoing embodiments, persons of ordinary skill in the art should understand that they may still make modifications on the technical solutions described in the foregoing embodiments or make equivalent replacements on some technical features thereof. However, these modifications or replacements do not enable the essence of corresponding technical solutions to depart from the spirit and scope of the technical solutions in the embodiments of this application.

What is claimed is:

1. An earphone, comprising:

a housing, wherein a sound output hole extends in the housing;

a bracket; and a first speaker and a second speaker, wherein the first speaker and the second speaker are separately and independently fastened in the housing, the first speaker produces a sound toward the sound output hole, the second speaker is located on a side of the first speaker that faces away from the sound output hole and is spaced apart from the first speaker, a sound production frequency of the second speaker is lower than a sound production frequency of the first speaker, and the first speaker is annular to define a sound output channel;

wherein the bracket is located between the first speaker and the sound output hole, the first speaker is fastened in the housing using the bracket, the bracket comprises an annular fixing portion, an outer peripheral edge of the first speaker is fastened on an inner peripheral surface of the housing by using the annular fixing portion, a first step is on the inner peripheral surface of the housing, and the annular fixing portion is supported and fastened on the first step; and wherein a cavity is defined by the first speaker, the second speaker, and an inner wall of the housing, the cavity serves as a front cavity of the second speaker, and the front cavity communicates with the sound output hole through the sound output channel.

2. The earphone according to claim 1, wherein the annular fixing portion comprises a fixing plate and an annular flange, the fixing plate is supported and fastened on a step surface of the first step that faces the second speaker, the annular flange is disposed around an edge of the fixing plate and protrudes toward a direction of the second speaker, and the outer peripheral edge of the first speaker is supported and fastened on an end surface on a side of the annular flange that faces away from the sound output hole.

3. The earphone according to claim 1, wherein a material of the annular fixing portion is a flexible material.

4. The earphone according to claim 1, wherein the annular fixing portion defines a sound transmission channel, and the sound transmission channel communicates with the sound output hole and the sound output channel.

5. The earphone according to claim 4, wherein the first speaker is a piezoelectric ceramic speaker, and the sound transmission channel serves as a front sound cavity of the first speaker.

6. The earphone according to claim 4, wherein a balancing hole extends in the housing, and an avoidance notch is at a location that is of the annular fixing portion and that corresponds to the balancing hole, and the avoidance notch communicates the balancing hole and the sound transmission channel.

7. The earphone according to claim 1, wherein the first speaker comprises an external terminal facing the sound output hole, a part of a surface that is of the annular fixing portion and that faces the first speaker is recessed toward a direction of the sound output hole to form an avoidance slot, and the avoidance slot is configured to avoid the external terminal.

8. The earphone according to claim 7, comprising a first signal wire; and wherein the avoidance slot extends to an outer peripheral edge of the annular fixing portion, an end of the first signal wire is fastened and electrically connected to the external terminal, and the first signal wire extends toward the direction of the second speaker through the avoidance slot.

9. The earphone according to claim 8, wherein an outer peripheral surface of the first speaker has a first contour surface, the inner peripheral surface of the housing has a first region directly facing the first contour surface, the first contour surface and the first region are spaced apart to form a first avoidance gap, the first avoidance gap communicates with the avoidance slot, and the first avoidance gap is configured to avoid the first signal wire.

10. The earphone according to claim 1, further comprising a noise-canceling microphone, wherein the noise-canceling microphone is located between the first speaker and the sound output hole, and the noise-canceling microphone is fastened in the housing by using the bracket.

11. The earphone according to claim 10, wherein the housing comprises a front housing, the front housing comprises a main portion and a sound outlet, a first accommodating cavity is in the main portion, the first speaker and the second speaker are both fastened in the first accommodating cavity, the sound outlet communicates with the first accommodating cavity, the sound output hole is formed at an end of the sound outlet that faces away from the main portion, and at least a part of the noise-canceling microphone is located in the sound outlet.

12. The earphone according to claim 10, wherein the bracket further comprises a support plate the support plate is fastened on the annular fixing portion and extends toward the direction of the sound output hole, and the noise-canceling microphone is fastened on the support plate.

13. The earphone according to claim 12, wherein the support plate is located at an inner circumference of the annular fixing portion and is connected to an inner peripheral wall of the annular fixing portion.

14. The earphone according to claim 13, wherein the annular fixing portion defines a sound transmission channel, the sound transmission channel communicates the sound output hole and the sound output channel, and orthographic projections of the support plate and the noise-canceling microphone on the first speaker are at an outer circumference of the sound output channel.

15. The earphone according to claim 12, further comprising a main board and a second signal wire, wherein the noise-canceling microphone is configured to be electrically connected to the main board through the second signal wire.

16. The earphone according to claim 15, wherein the main board is located on a side of the second speaker that faces away from the sound output hole, giving-way space is formed between the annular fixing portion and an inner wall surface of the housing, and the second signal wire extends toward a direction of the main board through the giving-way space.

17. The earphone according to claim 15, wherein the outer peripheral edge of the first speaker has a second contour surface, the inner peripheral surface of the housing has a second region directly facing the second contour surface, the second contour surface and the second region are spaced apart to form a second avoidance gap, and the second avoidance gap is configured to avoid the second signal wire.

18. A system, comprising:

an electronic device; and an earphone in communication with the electronic device and configured to output sound information received from the electronic device, the earphone comprising:

a housing, wherein a sound output hole extends in the housing;

a bracket; and a first speaker and a second speaker, wherein the first speaker and the second speaker are separately and independently fastened in the housing, the first speaker produces a sound toward the sound output hole, the second speaker is located on a side of the first speaker that faces away from the sound output hole and is spaced apart from the first speaker, a sound production frequency of the second speaker is lower than a sound production frequency of the first speaker, and the first speaker is annular to define a sound output channel;

wherein the bracket is located between the first speaker and the sound output hole, the first speaker is fastened in the housing using the bracket, the bracket comprises an annular fixing portion, an outer peripheral edge of the first speaker is fastened on an inner peripheral surface of the housing by using the annular fixing portion, a first step is on the inner peripheral surface of the housing, and the annular fixing portion is supported and fastened on the first step; and wherein a cavity is defined by the first speaker, the second speaker, and an inner wall of the housing, the cavity serves as a front cavity of the second speaker, and the front cavity communicates with the sound output hole through the sound output channel.

19. The system according to claim 18, wherein the electronic device is a mobile phone.

20. The system according to claim 18, wherein the an earphone is configured for wireless communication with the electronic device.

* * * * *